United States Patent
Nishikawa

(10) Patent No.: US 9,866,729 B2
(45) Date of Patent: Jan. 9, 2018

(54) IMAGE PROCESSING APPARATUS, IMAGE PROCESSING METHOD, AND STORAGE MEDIUM FOR COLOR SEPARATION AND QUANTIZATION PROCESSING

(71) Applicant: CANON KABUSHIKI KAISHA, Tokyo (JP)

(72) Inventor: Hiromitsu Nishikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/279,795

(22) Filed: Sep. 29, 2016

(65) Prior Publication Data
US 2017/0104894 A1 Apr. 13, 2017

(30) Foreign Application Priority Data
Oct. 8, 2015 (JP) .................. 2015-200484

(51) Int. Cl.
*H04N 1/60* (2006.01)
*H04N 1/54* (2006.01)
*H04N 1/405* (2006.01)

(52) U.S. Cl.
CPC .......... *H04N 1/6019* (2013.01); *H04N 1/54* (2013.01); *H04N 1/6058* (2013.01); *H04N 1/6075* (2013.01); *H04N 1/6077* (2013.01); *H04N 1/4051* (2013.01)

(58) Field of Classification Search
None
See application file for complete search history.

(56) References Cited

U.S. PATENT DOCUMENTS

| 6,798,537 B1* | 9/2004 | Lau ............... H04N 1/405 358/1.9 |
| 2011/0090518 A1* | 4/2011 | Marumoto ........ B41J 29/38 358/1.8 |
| 2012/0229549 A1* | 9/2012 | Shibata ............ B41J 2/04508 347/15 |
| 2015/0213342 A1* | 7/2015 | Fukamachi ....... H04N 1/6097 358/1.9 |

FOREIGN PATENT DOCUMENTS

| JP | 2006-177797 A | 7/2006 |
| JP | 2008-219291 A | 9/2008 |
| JP | 4561483 B2 | 10/2010 |

* cited by examiner

*Primary Examiner* — Barbara Reinier
(74) *Attorney, Agent, or Firm* — Carter, DeLuca, Farrell & Schmidt, LLP

(57) ABSTRACT

An image processing apparatus of the embodiments includes: an input unit configured to input a hue signal representing a hue of an image and an image quality signal representing a texture of the image; a conversion unit configured to convert the image quality signal into a physical quantity signal indicating at least one physical quantity of a refractive index of a color material, surface roughness of an image, an area ratio of dots on an image surface, and a layer thickness of a color material in an image corresponding to the image quality signal; and a dot arrangement determination unit configured to determine a color material dot arrangement for outputting the image based on the hue signal and the physical quantity signal.

12 Claims, 19 Drawing Sheets

| C | M | Y | K | c | m | gy | L* | a* | b* | QUANTIZATION METHOD OF HIGH DISPERSION TYPE | | | QUANTIZATION METHOD OF LOW DISPERSION TYPE | | |
|---|---|---|---|---|---|---|---|---|---|---|---|---|---|---|---|
| | | | | | | | | | | REFRACTIVE INDEX | SURFACE ROUGHNESS | GRANULARITY | REFRACTIVE INDEX | SURFACE ROUGHNESS | GRANULARITY |
| 0 | 0 | 0 | 142 | 0 | 0 | 221 | 5.78747 | 0.235788 | 0.404982 | 86.1786 | 52.2003 | 9.0411 | 43.0893 | 26.1002 | 18.0822 |
| 118 | 118 | 0 | 51 | 0 | 0 | 181 | 8.85007 | -0.71204 | -7.46509 | 56.6495 | 41.2483 | 12.413 | 28.3248 | 20.6242 | 24.826 |
| 171 | 171 | 0 | 14 | 0 | 0 | 127 | 10.317 | -0.76699 | -13.3591 | 51.9364 | 38.8197 | 13.3834 | 25.9682 | 19.4099 | 26.7668 |
| 195 | 195 | 0 | 0 | 0 | 0 | 70 | 11.188 | 0.368667 | -19.2856 | 48.5219 | 36.9825 | 14.4002 | 24.261 | 18.4913 | 28.8004 |
| 210 | 210 | 0 | 0 | 0 | 0 | 0 | 12.1934 | 1.64621 | -25.6458 | 45.0865 | 35.3802 | 15.5507 | 22.5433 | 17.6901 | 31.1014 |
| 127 | 9 | 79 | 46 | 0 | 0 | 132 | 13.2191 | 3.15429 | -31.3352 | 43.82 | 34.5543 | 16.5349 | 21.91 | 17.2772 | 33.0698 |
| 197 | 20 | 3 | 22 | 0 | 0 | 162 | 13.8441 | 5.32929 | -37.1512 | 43.4967 | 34.0021 | 17.4673 | 21.7484 | 17.0011 | 34.9346 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 213 | 81 | 1 | 3 | 0 | 3 | 120 | 14.2866 | 8.06046 | -42.4396 | 42.6616 | 33.4166 | 18.2685 | 21.3308 | 16.7083 | 36.537 |
| 226 | 132 | 1 | 0 | 0 | 6 | 58 | 14.9624 | 10.9402 | -47.2744 | 42.055 | 33.0945 | 19.1779 | 21.0275 | 16.5473 | 38.3558 |

FIG.18

IMAGE PROCESSING APPARATUS, IMAGE PROCESSING METHOD, AND STORAGE MEDIUM FOR COLOR SEPARATION AND QUANTIZATION PROCESSING

BACKGROUND OF THE INVENTION

Field of the Invention

The present invention relates to image processing to perform color separation processing and quantization processing.

Description of the Related Art

In an ICC (International Color Consortium) profile that is commonly used in a print device, color material amounts are associated with a device-independent color space, such as L*a*b* and XYZ. As an example of color material amounts, there is a case where color material amounts of 0 to 255 are allocated to color materials, such as cyan (C), magenta (M), yellow (Y), and black (K). Further, there is a printer having more than ten kinds of color material by adding color materials, such as red (R), green (G), and blue (B), in order to reproduce a more vivid color, and adding color materials, such as pale cyan (PC), pale magenta (PM), and gray (Gy), in order to reproduce a multi-tone level.

That is, compared to three-dimensional or four-dimensional data that has been input hitherto commonly as an input signal, such as R, G, and B or C, M, Y, and K, an output of color separation will be data including four to more than ten colors. The fact that the number of dimensions of an output is large such as this is also true with the case where an input is data representing a color in the device-independent color space, such as L*a*b* and XYZ, as in the ICC profile described previously.

In general, in the case where the number of dimensions of an output is large for the number of dimensions of an input, there exist a large number of output solutions. Explanation is given by taking a color separation lookup table (hereinafter, described as "LUT") as an example. There exists a plurality of combinations of C, M, Y, and K that reproduce a certain one L*a*b*. As to the existence of a plurality of combinations such as this, in the well-known UCR (Under Color Removal) technique, in the case where the color material amounts of C, M, and Y are (C, M, Y)=(70, 50, 30), respectively, then, from $C'=C-\text{Min}(C,M,Y)$ $M'=M-\text{Min}(C,M,Y)$ $Y'=Y-\text{Min}(C,M,Y)$ $K=\text{Min}(C,M,Y),$ (C', M', Y', K)=(40, 20, 0, 30) are calculated. Here, according to the fundamental rule of UCR, color material amount 1 and color material amount 2 expressed as $(C_1,M_1,Y_1,K_1)=(70,50,30,0)$      (color material amount 1)

$(C_2,M_2,Y_2,K_2)=(40,20,0,30)$      (color material amount 2)

will reproduce the same color although they are different combinations of color material amounts.

In the above-described example, the case of UCR is explained for the sake of simplification of explanation, but also in GCR (Gray Component Replacement), which is an improved version of UCR, by the setting of a K amount based on a GCR ratio, a plurality of combinations of color material amounts is calculated. Further, this also applies to the case (Japanese Patent No. 4561483) where colors and color material amounts are associated by using the Cellular Yule-Nielsen Spectral Neugebauer Model or the like. That is, a plurality of combinations of color material amounts exists for one color.

The above-described plurality of combinations of color material amounts can reproduce the same color but exhibit different characteristics in various image quality items, such as granularity indicating the roughness of an image, color constancy indicating a change in color under a plurality of observation light sources, a specular gloss unit, and gloss image clarity.

Here, a color separation LUT stores one combination of color material amounts, corresponding to hue values, such as L*a*b* and RGB. Because of this, in the technique of Japanese Patent No. 4561483, by using conditions, such as a color difference from a target color, a color difference under a plurality of observation light sources, granularity, and a color material amount limiting value depending on a printing medium, the solutions are narrowed down to one solution from a plurality of combinations of color material amounts reproducing the same color. That is, what can be stored in the color separation LUT is only one combination among the plurality of combinations of color material amounts capable of reproducing the same color and having different image qualities, such as the granularity and the specular gloss unit.

On the other hand, the subjects of photographs, which are objects to be output by a printer, include a variety of objects, such as highly glossy objects such as metals, lowly glossy objects such as fibers, objects the surface of which is rough, and objects the surface of which is smooth, although they have the same color (hereinafter, the attribute of a subject other than hues, such as gloss and roughness, is described as "texture").

Further, in the case where printing of an image is performed by a printer, in general, the number of tone levels that can be reproduced per pixel in a printer is small compared to the number of tone levels per pixel in a digital image (e.g., 8 bits/256 tone levels per pixel). Because of this, as a printer in the prior art, one that converts the color separation data indicating color material amounts into quantization data of tone levels less in the number and uses the converted quantization data in area gradation processing is known. As the quantization method such as this, various publicly known techniques exist, such as the error diffusion method and the dither matrix method. It is known that an image to be printed by a printer changes characteristics in image quality to be printed in accordance with the quantization method, such as the error diffusion method and the dither matrix method.

SUMMARY OF THE INVENTION

However, the color separation LUT in the current print system stores only one combination of color material amounts for the same hue value, and therefore, it is not possible to reproduce a subject the texture of which is different even though the color of which is the same.

Further, for the quantization processing in the current print system, one quantization method is used for only one combination of color material amounts, and therefore, the characteristics of image quality to be printed are fixed.

An image processing apparatus according to the present invention has: an input unit configured to input a hue signal representing a hue of an image and an image quality signal representing a texture of the image; a conversion unit configured to convert the image quality signal into a physical quantity signal indicating a physical quantity corresponding to the image quality signal; and a dot arrangement determination unit configured to determine a color material dot arrangement for outputting the image based on the hue signal and the physical quantity signal.

Further features of the present invention will become apparent from the following description of exemplary embodiments (with reference to the attached drawings).

BRIEF DESCRIPTION OF THE DRAWINGS

FIG. 18 is a diagram showing an example of an LUT configuration in a second embodiment.

DESCRIPTION OF THE EMBODIMENTS

Hereinafter, embodiments of the present invention are explained with reference to the drawings. Explanation is given by attaching the same symbols to the same configurations. In the present embodiments, an image quality item other than hues, for example, such as gloss and roughness of a subject, is also described as "texture". Further, a quantity obtained by optically measuring and digitizing various properties, such as the degree of granularity indicating the roughness of an image, the refractive index of a color material relating to gloss, and the surface roughness of a color material on a printing medium, is described as "physical quantity".

First Embodiment

Problem in Generating LUT by Adding Image Quality Item

In the present embodiment, by associating a plurality of different combinations of color material amounts reproducing the same hue value with physical quantities relating to textures, it is made possible to reproduce different textures with the same color.

Figure 1A:
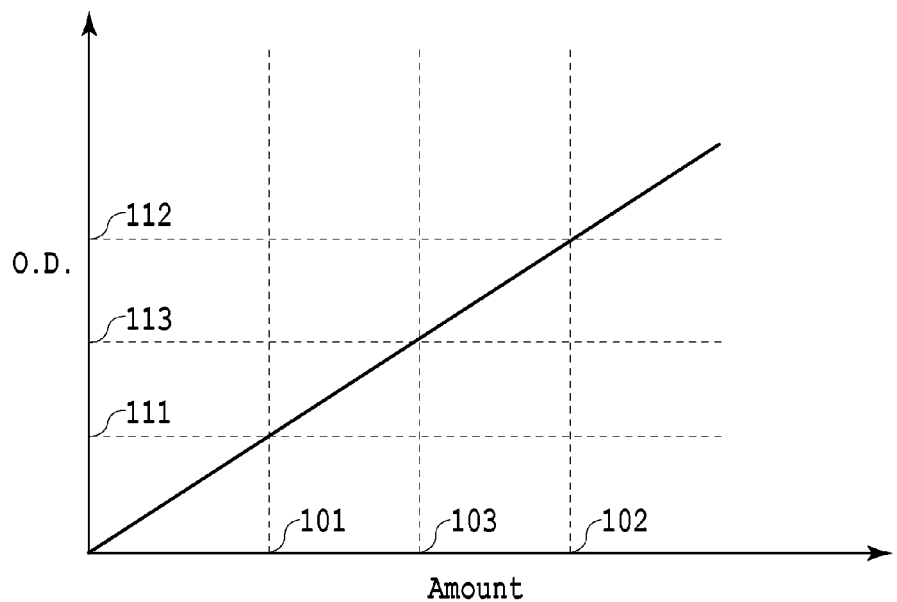
FIG. 1A is a diagram showing an example of a relationship between color material amounts and densities.

Here, it is difficult to generate an LUT by directly associating, for example, the image quality, such as the specular gloss unit, with the color material amount. The solid line shown in FIG. 1A indicates an example of a graph representing the results of measuring a density (O. D.), which is an example of the hue value for the color material amount (Amount) of a certain one color material. As shown in FIG. 1A, the color material amount and the density have a high correlation and are suitable for image processing combining an LUT and interpolation. That is, as for a density 113 at a color material amount 103 that is found by interpolation, it is possible to easily calculate a value that coincides with or is very close the measured result from a density 111 at a color material amount 101 and a density 112 at a color material amount 102. Consequently, it is possible to calculate a density corresponding to an arbitrary color material amount between grid points. This is also true with inverse conversion and in the case where the density for which interpolation is to be performed is taken to be 113, it is possible to easily calculate the color material amount 103 at the density 113 by interpolation from the color material amount 101 at the density 111 and the color material amount 102 at the density 112. Consequently, it is possible to easily calculate a color material amount corresponding to an arbitrary density between grid points by interpolation.

Figure 1B:
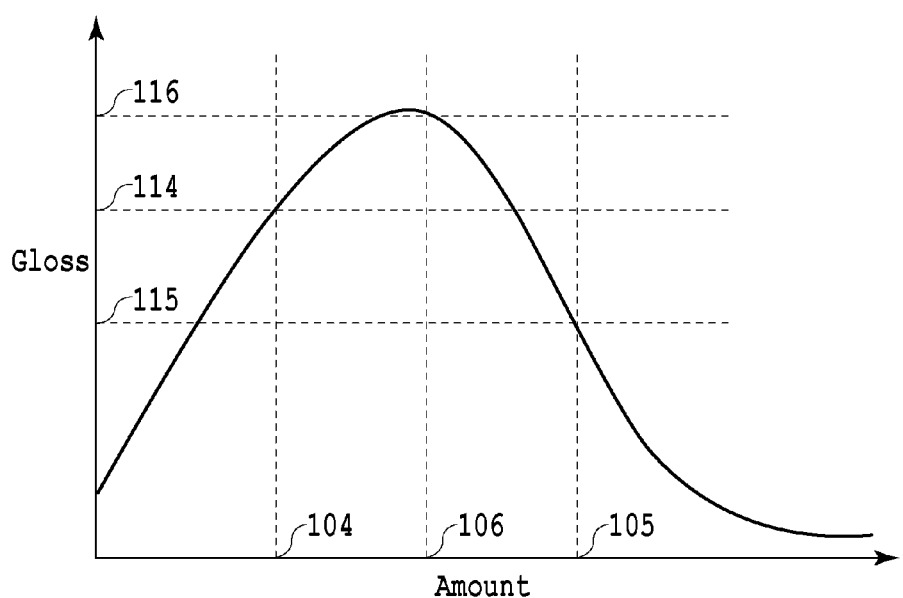
FIG. 1B is a diagram showing an example of a relationship between color material amounts and specular gloss units.

On the other hand, the solid line shown in FIG. 1B is an example of a graph representing the results of measuring the color material amount (Amount) of a certain one color material and the specular gloss unit, which is one kind of texture. In particular, in the case where a color material having a high specular gloss unit compared to a printing medium, such as a pigment color material, is formed on the surface of an image, the color material amount and the specular gloss unit change as the solid line shown in FIG. 1B. The reason is that where the color material amount is small, the specular gloss unit increases because a printing medium having a low specular gloss unit is covered with a color material having a high specular gloss unit and after the entire surface is covered, roughness is formed on the surface due to deposition of the color material, and therefore, it is predicted that the specular gloss unit decreases because specularly reflected light scatters.

Here, as shown in FIG. 1B, the color material amount and the specular gloss unit have a low correlation and are not suitable for image processing combining an LUT and interpolation. That is, in the case where grid points of an LUT are taken to be a color material amount 104 and a color material amount 105 and a color material that is found by interpolation is taken to be 106 shown in FIG. 1B, it is not possible to find a specular gloss unit 116 at the color material amount 106 by interpolation from a specular gloss unit 114 at the color material amount 104 and a specular gloss unit 115 at the color material amount 105. That is, in the case where interpolation calculation is performed, the specular gloss unit 116 exists between the specular gloss unit 114 and the specular gloss unit 115, and therefore, the specular gloss unit 116 is calculated as a very small value compared to the measured specular gloss unit 116 shown in FIG. 1B. Further, in the case of inverse conversion, a color material amount that implements the specular gloss unit 116 does not exist.

As above, as for the image quality item having a low correlation with the color material amount, such as the specular gloss unit, control by the image processing using an LUT and interpolation is not suitable. As an image quality item having a low correlation with the color material amount, mention is made of gloss image clarity, gloss coloring, etc., in addition to the specular gloss unit.

In the present embodiment, it may also be possible to evenly or unevenly arrange grid points of the LUT. Further, it may also be possible to densely arrange grid points where, for example, a change in the signal value is steep and to sparsely arrange where a change is small, and the aspect of arrangement is not limited.

[Conversion of Image Quality Item into Physical Quantity]
[Specular Gloss Unit and Gloss Image Clarity]

Here, according to the definition of the specular gloss unit, the well-known specular gloss unit is calculated by Formula (1) below.

$$G_s(\theta) = \frac{\varphi_s}{\varphi_{os}} \cdot G_{os}(\theta) \quad \text{Formula (1)}$$

$\varphi_s$: light flux reflected from a sample surface with respect to a specified incidence angle $\theta$ $\varphi_{os}$: light flux reflected from a standard surface with respect to the specified incidence angle $\theta$ $G_{os}$: gloss unit (%) of the standard surface calculated by Formula (2) below.

$$G_{os}(\theta) = \frac{\int S_D(\lambda)V(\lambda)\rho(\theta,\lambda)d\lambda}{\int S_D(\lambda)V(\lambda)d\lambda} \cdot \frac{1}{\rho_0(\theta)} \times 100 \quad \text{Formula (2)}$$

$S_D(\lambda)$: relative spectral distribution of standard light $D_{65}$
$V(\lambda)$: light flux reflected from the standard surface with respect to the specified incidence angle $\theta$
$\rho_o(\theta,\lambda)$: specular reflectance at the specified incidence angle $\theta$ on a glass surface having a constant refractive index of 1.567 across the entire visible wavelength range
$\rho(\theta,\lambda)$: spectral specular reflectance of a primary standard surface at the specified incidence angle $\theta$ that is found by Formula (3), which is Fresnel equation, by using a refractive index $n(\lambda)$ $$\rho(\theta,\lambda) = \frac{1}{2}\left[\left(\frac{\cos\theta - \sqrt{n(\lambda)^2 - \sin^2\theta}}{\cos\theta + \sqrt{n(\lambda)^2 - \sin^2\theta}}\right)^2 + \left(\frac{n(\lambda)^2\cos\theta - \sqrt{n(\lambda)^2 - \sin^2(\theta)}}{n(\lambda)^2\cos\theta + \sqrt{n(\lambda)^2 - \sin^2\theta}}\right)^2\right] \quad \text{Formula (3)}$$

According to the measurement conditions of the specular gloss unit, the following light source and photoreceptor are used. That is, as a light source, the standard light for colorimetry and the standard light $D_{65}$ are used commonly. As a photoreceptor, one is used that is equivalent to a combination of a color matching function
$\bar{y}(\lambda)$
shown in a color representing method, i.e., the XYZ color system and spectral luminous efficiency identical to the color matching function. That is, in the case where a spectral specular reflectance (hereinafter, described as $\alpha(\theta,\lambda)$) of the reflected light with respect to the incidence angle $\theta$ of an arbitrary specular gloss unit measurement sample is known, it is possible to simulate (predict) the light flux $\varphi_s$ reflected from the sample surface in Formula (1) by Formula (4) below.

$$\varphi_s = \int S_D(\lambda)V(\lambda)\alpha(\theta,\lambda)d\lambda \quad \text{Formula (4)}$$

Similarly, it is also possible to simulate the reflected light flux $\varphi_{os}$ of the primary standard surface by using the spectral specular reflectance $\rho(\theta,\lambda)$ of the standard surface expressed in Formula (2) by using Formula (5) below.

$$\varphi_{os} = \int S_D(\lambda)V(\lambda)\rho(\theta,\lambda)d\lambda \quad \text{Formula (5)}$$

That is, it is known that the specular gloss unit can be simulated by Formula (6) below by using the spectral specular reflectance $\alpha(\theta,\lambda)$ with respect to the angle $\theta$ of an arbitrary sample in the case where Formula (1) is changed by using Formulas (2), (4), and (5).

$$G_s(\theta) = \frac{\int S_D(\lambda)V(\lambda)\alpha(\theta,\lambda)d\lambda}{\int S_D(\lambda)V(\lambda)d\lambda} \cdot \frac{1}{\rho_0(\theta)} \times 100 \quad \text{Formula (6)}$$

As the method of calculating the spectral specular reflectance of reflected light with respect to the incidence angle $\theta$ of a certain sample surface the refractive index $n(\lambda)$ of which is already known, it is possible to apply Formula (3) (Fresnel equation) described above.

From the above, the specular gloss unit of a print surface using a combination of color materials is determined from the spectral refractive index (hereinafter, described as "refractive index") $n(\lambda)$ of the color material on the surface and is interconvertible. However, the above-described Formula premises the specular reflection, and therefore, the influence by diffusion of the specularly reflected light due to the roughness shape of the surface is not taken into consideration.

Figure 2:
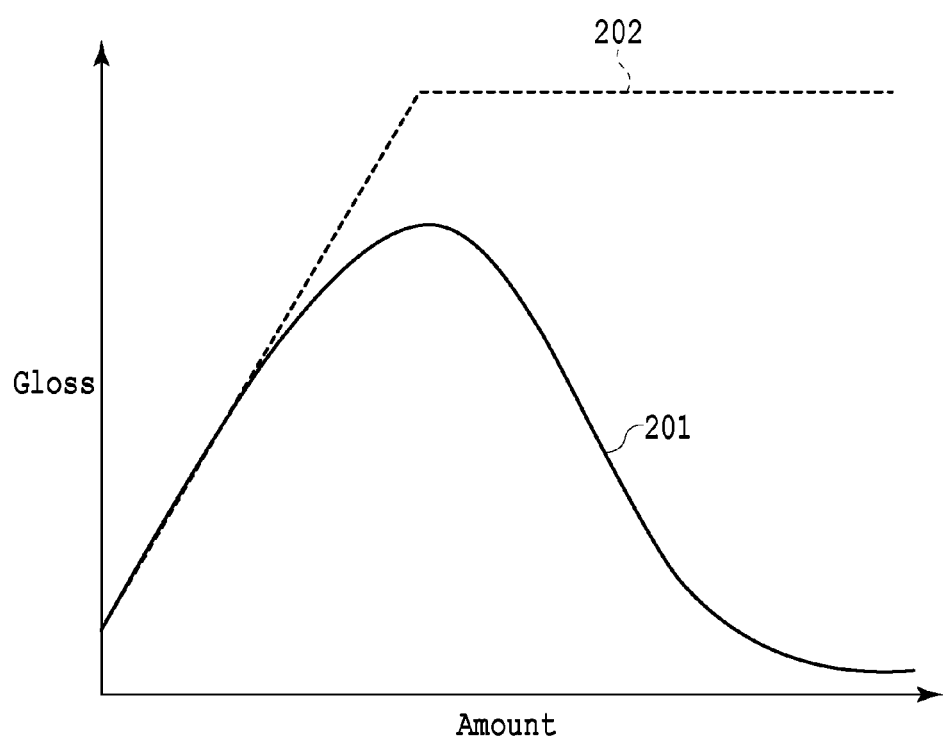
FIG. 2 is a diagram showing a relationship between color material amounts and specular gloss units.

A graph 201 in FIG. 2 represents the results of measuring the specular gloss unit shown in FIG. 1B. A graph 202 represents the specular gloss unit calculated by using a refractive index $n_i(\lambda)$ of the color material and a refractive index $n_m(\lambda)$ relatively lower than that of the color material from the above-described Formula. As represented by the graph 202, the specular gloss unit that does not take into consideration the roughness of the surface is a value that depends on only the refractive index $n_m(\lambda)$ of the printing medium in the case where the color material amount is 0. After this, until the surface of the printing medium is covered with the color material, the specular gloss unit increases in accordance with the coverage based on the refractive index $n_i(\lambda)$ of the color material and after the surface is completely covered, the specular gloss unit depends on only the refractive index $n_i(\lambda)$ of the color material. Here, the difference between the graph 201 and the graph 202 is caused by the influence of the roughness of the surface and the rougher the surface shape, the more scattering of the specularly reflected light occurs, and therefore, the specular gloss unit decreases. That is, it is possible to find a value corresponding to the roughness of the image surface by calculating the difference between the graph 201 and the graph 202.

Next, the gloss image clarity is described. The gloss image clarity refers to vividness of a specularly reflected light image and in the case where the reflecting surface is smooth like a mirror, the specularly reflected light image becomes vivid and in the case where the reflecting surface is rough and the specularly reflected light is scattered, the specularly reflected light image becomes vague. That is, the gloss image clarity has a high correlation with the roughness of the reflecting surface.

Figure 3:
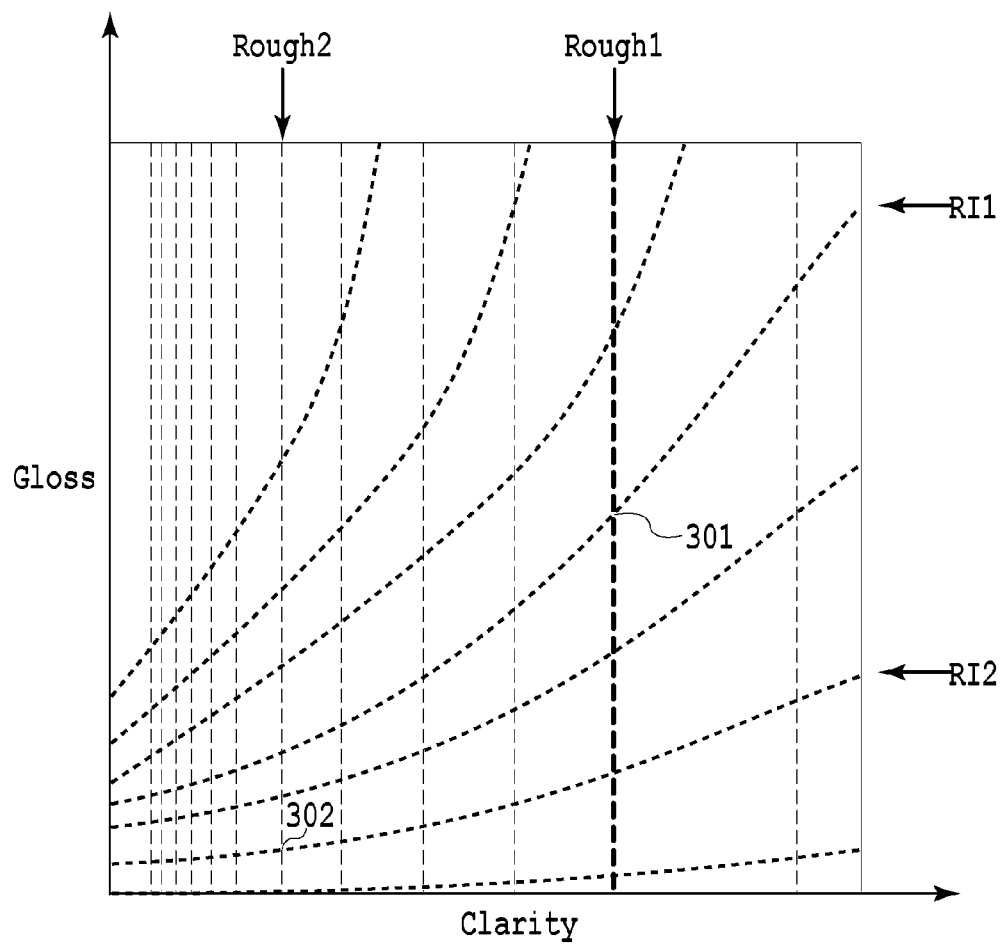
FIG. 3 is a diagram showing an example of a relationship between gloss and physical quantities in the present embodiment.

That is, the surface refractive index and the surface roughness have a high correlation with respect to the specular gloss unit and the gloss image clarity, which are image quality items. FIG. 3 shows a relationship between the surface refractive index and the surface roughness with respect to the specular gloss unit calculated by using the above-described Formula of the specular gloss unit, and the gloss image clarity. In the case where the horizontal axis represents the gloss image clarity (Clarity) and the vertical axis represents the specular gloss unit (Gloss), a line connecting values the surface refractive index (RI) of which is equal (hereinafter, described as a "contour line") and the contour line of the surface roughness (Rough) intersect on the graph. That is, in the case where the surface refractive index is RI1 and the surface roughness is Rough 1, it is possible to find the gloss image clarity and the specular gloss unit at an intersection 301. Similarly, in the case where the surface refractive index is RI2 and the surface roughness is Rough 2, the gloss image clarity and the specular gloss unit at an intersection 302 are known. Further, inverse conversion is also possible and in the case where the gloss image clarity and the specular gloss unit are known, it is possible to calculate the surface refractive index and the surface roughness. That is, the surface refractive index and the surface roughness corresponding to the gloss image clarity and the specular gloss unit are interconvertible physical values.

Figure 4:
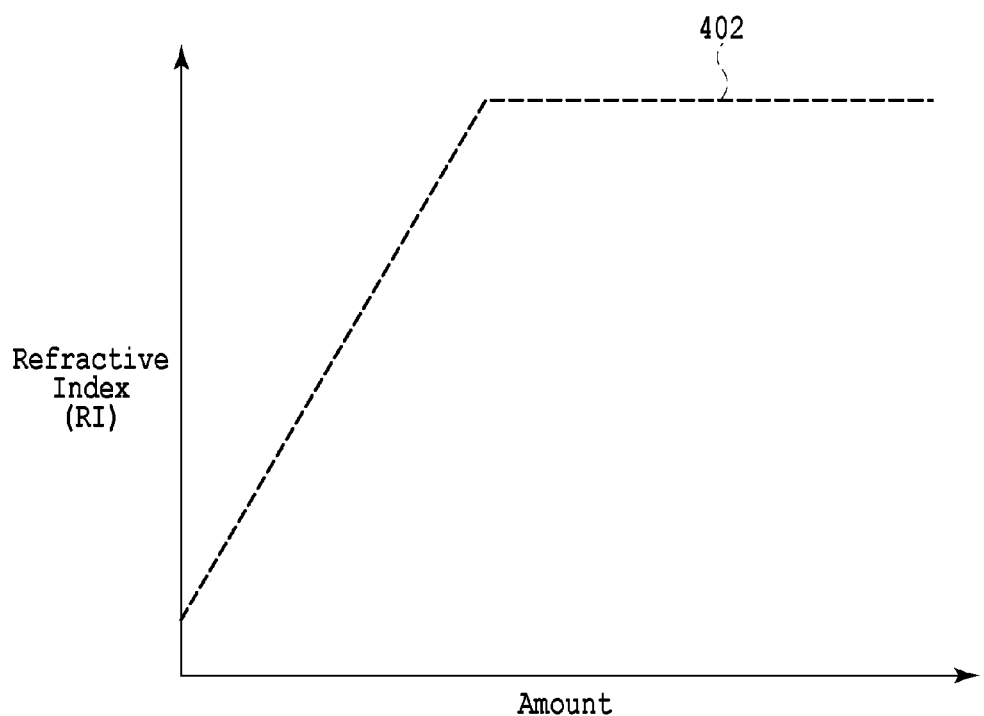
FIG. 4 is a diagram showing a relationship between color material amounts and surface refractive indices.

Consequently, even in the case of the image quality items having no correlation with the color material amount described previously, such as the specular gloss unit, and for which interpolation using an LUT is difficult to perform, they become to have a high correlation by converting them into interconvertible physical values. For example, FIG. 4 shows a relationship between the color material amount and the surface refractive index. As is known from a graph 402, the color material amount and the surface refractive index have a high correlation, and therefore, are suitable for the control by LUT interpolation.

[Gloss Coloring]

For printed matter using a pigment color material, a phenomenon is known in which the specularly reflected light of an image formed on the printing medium colors. For example, in the case where an image formed by the pigment color material is placed under a light source, such as a spotlight, despite that the spotlight itself emits white light, the light specularly reflected colors, which is the white light reflected from the surface of the printing material. That is, coloring of specularly reflected light refers to that the illumination light that illuminates an image formed on a printing material comes to have a color different from the original color of the illumination light in the case where the illumination light is reflected from the image. In particular, in the area where a large amount of cyan (C) color material is used, the specularly reflected light becomes magenta and in a monochrome image in which a large amount of black (K) material is used, the specularly reflected light yellows as a whole.

Figure 5C:
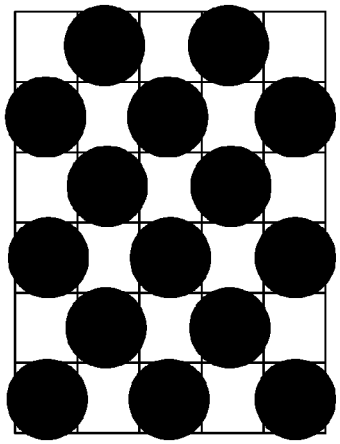
FIG. 5C is a diagram for explaining area gradation.
Figure 5B:
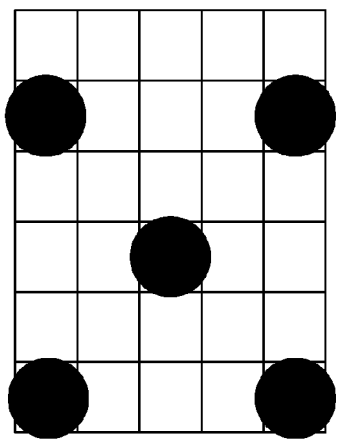
FIG. 5B is a diagram for explaining area gradation.
Figure 5A:
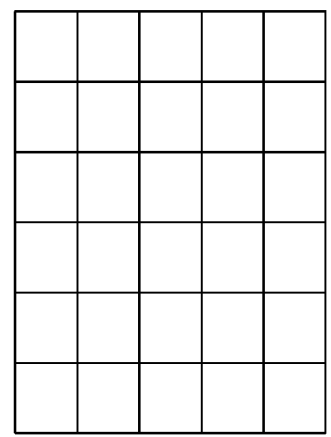
FIG. 5A is a diagram for explaining area gradation.

One of the factors that cause the specularly reflected light to color is a bronze phenomenon. The bronze phenomenon is greatly contributed by the wavelength dependence of reflection at the interface between the air layer and the color material layer. It is possible to know the wavelength dependence of reflection from the refractive index $n_i(\lambda)$. FIG. 5A to FIG. 5C show the way the color material indicated by a black circle is fixed onto a printing medium. FIG. 5A shows only the printing medium, FIG. 5B shows the way about 17% of the printing medium is covered with the color material, and FIG. 5C shows the way about 50% of the printing medium is covered with the color material. Here, in the case where the refractive index of the printing medium is taken to be $n_p(\lambda)$, then the refractive index in FIG. 5A is $n_p(\lambda)$, and in the case where the refractive index in FIG. 5B is taken to be $n_b(\lambda)$, then, $n_b(\lambda)$ is calculated by Formula (7) below.

$$n_b(\lambda) = \frac{17 * n_i(\lambda) + (100 - 17) * n_p(\lambda)}{100} \qquad \text{Formula (7)}$$

Similarly, in the case where the refractive index in FIG. 5C is taken to be $n_c(\lambda)$, then $n_c(\lambda)$ is calculated by Formula (8) below.

$$n_c(\lambda) = \frac{50 * n_i(\lambda) + (100 - 50) * n_p(\lambda)}{100} \qquad \text{Formula (8)}$$

That is, it is known that gloss coloring caused by the bronze phenomenon changes depending on the area ratio between the color material existing on the print surface and the printing medium. In this case, the color material amount and the area ratio of the surface color material have a high correlation, and therefore, it is made possible to perform control by LUT interpolation. In the examples in FIG. 5A to FIG. 5C, explanation is given for the case where there is one kind of color material, but a plurality of kinds of color material may be used.

From the above, the refractive indexes and the area ratios of a plurality of kinds of color material are interconvertible with the colors in the bronze phenomenon, the refractive index is constant for each kind of color material, and the area ratio and the color material amount have a high correlation, and therefore, it is made possible to perform control by interpolation using an LUT.

Figure 6:
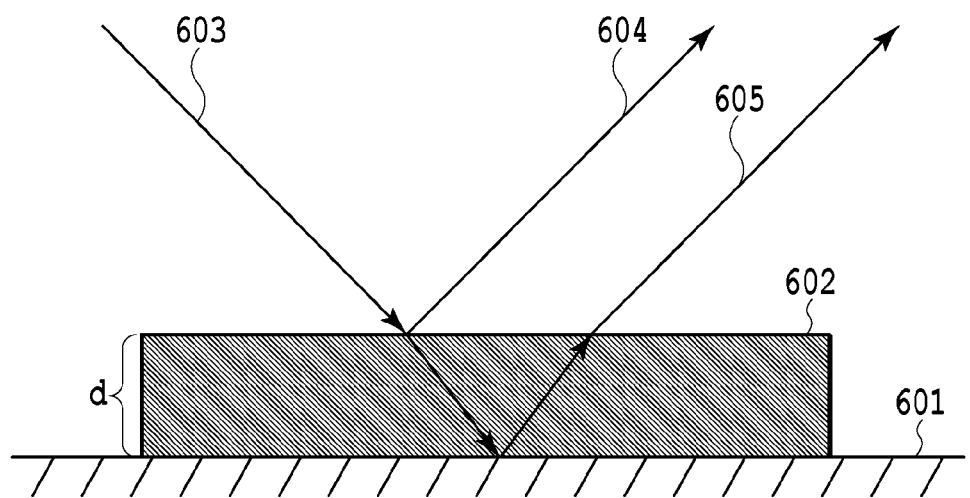
FIG. 6 is a diagram for explaining thin layer interference.

On the other hand, depending on the area of an image, the specularly reflected light changes to rainbow colors in accordance with the change in the color material amount. This is a phenomenon called thin layer interference that occurs in accordance with the thickness of a thin layer formed by a color material spreading thinly and evenly on a printing medium. FIG. 6 shows the way a transparent color material or a pale color material that is thin and even and which absorbs a comparatively small amount of light forms a thin layer 602 having a layer thickness of d on a printing medium 601. Light 603 incident on the thin layer 602 is observed as reflected light including surface reflected light 604 and internally reflected light 605 having transmitted the inside of the color material. At this time, the light wavelengths of the surface reflected light 604 and the internally reflected light reinforce one another/cancel each other out, and thus, the reflected light colors. This is the commonly known phenomenon of thin layer interference.

Figure 7:
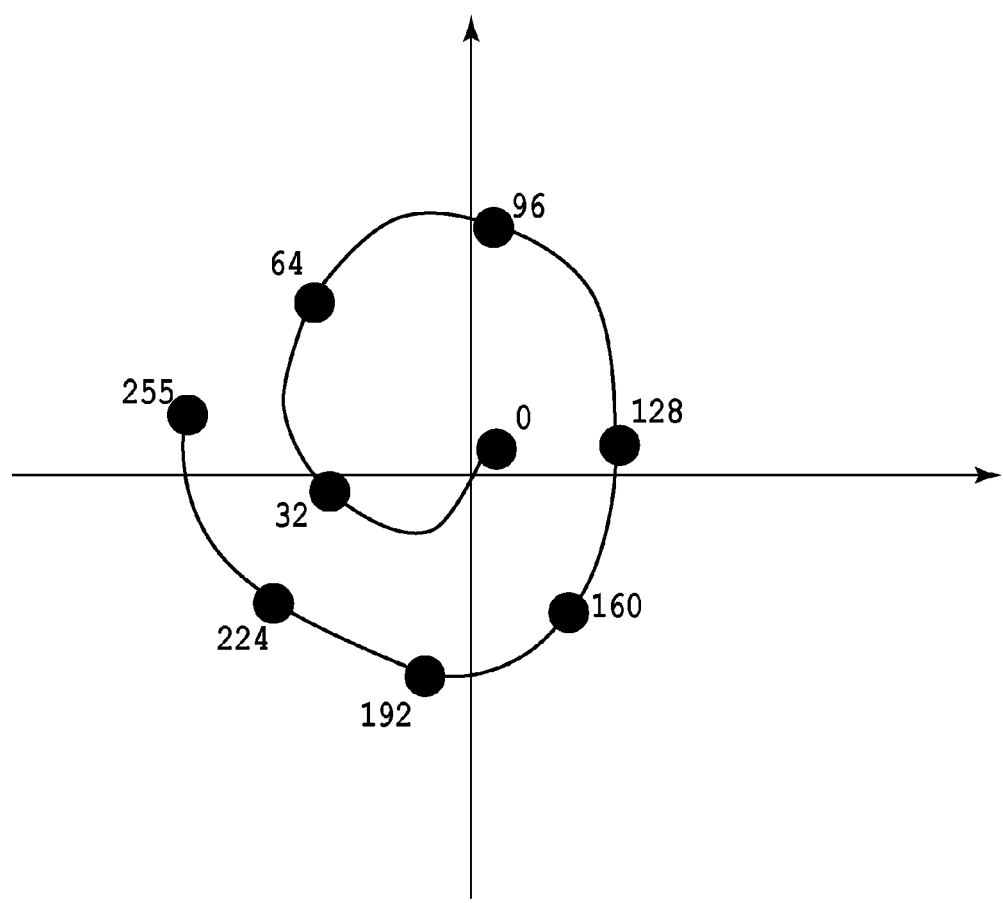
FIG. 7 is a diagram showing an example of results of gloss coloring.
Figure 8:
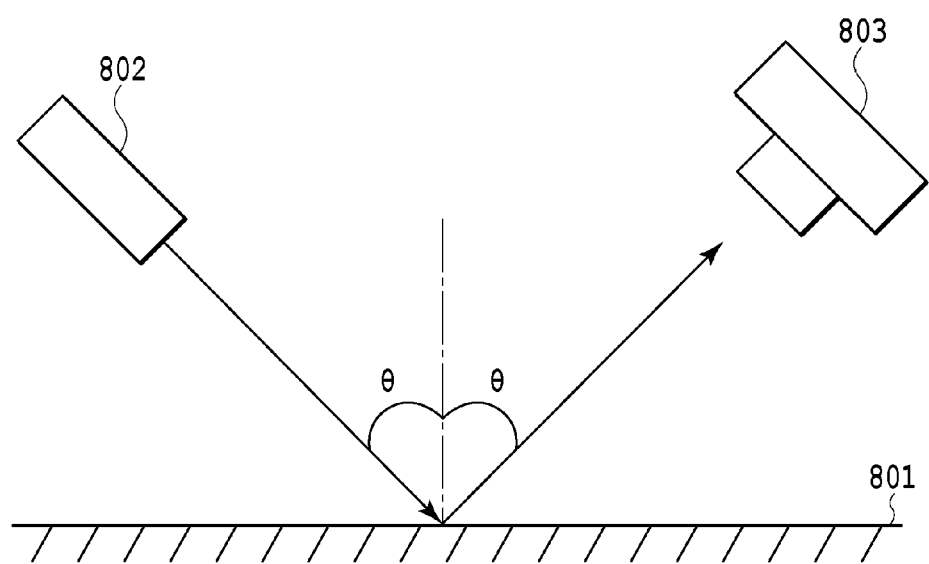
FIG. 8 is a diagram showing an example of a measurement method of gloss coloring in the present embodiment.

FIG. 7 shows the way coloring is measured and plotted on the a*b* plane in the CIE L*a*b* color system in the case where a thin layer of a colorless, transparent liquid is formed on a printing medium by using the ink jet technique. For measurement, the measurement method described in Japanese Patent Laid-Open No. 2006-177797 was used. The method of evaluating numerical values of coloring of specular reflection described in Japanese Patent Laid-Open No. 2006-177797 is explained by using FIG. 8. Reference letter 801 indicates a measurement sample and a light source 802 illuminates the measurement sample 801 at a predetermined angle and the light specularly reflected from the measurement sample 801 is detected by a photoreceptor 803. By the photoreceptor 803, tri-stimulus values XxYxZx in the CIE XYZ color system are detected. Tri-stimulus values XsYsZs of a sample (e.g., a black polished glass plate having a refractive index with small wavelength dispersion) that does not cause the bronze phenomenon are held in advance, and then, a*b* in the CIE L*a*b* color system are calculated from XxYxZx and XsYsZs.

The numerical value in the graph in FIG. 7 is an ink value in the case where the ink value that controls the amount of ink is taken to be an 8-bit value. As shown in FIG. 7, in the case where a thin layer is formed by using a transparent liquid, the color of specularly reflected light changes so as to go around a hue circle. Because of this, the hue value on the a*b* plane in the CIE L*a*b* color system, which is used for the evaluation method of coloring of specular reflection has a low correlation with the change in the amount of ink, and therefore, the color value cannot used for LUT processing as it is.

As described above, the thin layer interference is a phenomenon that occurs in the case where the light wavelengths of the surface reflected light 604 and the internally reflected light 605 reinforce one another/cancel each other out, and the change in coloring depends on the difference in the optical path length between the surface reflected light 604 and the internally reflected light 605. Here, the optical path length of the internally reflected light 605 depends on the layer thickness d of the thin layer, and therefore, it is possible to find the gloss coloring in the case where the layer thickness d is known. The layer thickness d of the thin layer has of course a high correlation with the amount of ink, and therefore, by using the layer thickness, it is possible to perform LUT processing of thin layer interference. More specifically, in the case where the layer thickness d changes in accordance with the amount of ink as in the relationship between the amount of ink and the gloss coloring shown in FIG. 7, the difference in the optical path length between the surface reflected light 604 and the internally reflected light 605 changes. In accordance with the change in the optical path length, the hue angle of coloring of specularly reflected light changes. The control using this LUT controls the changes in the amount of ink and the hue angle.

Another Example

Examples of the image quality item relating to the texture other than those described above which have a high correlation with the amount of ink include granularity representing the roughness of an image. The granularity is a phenomenon in which dots of a dark color material are conspicuous in the case where the dark color material is formed on a pale background or paper white, and therefore, the roughness is perceived. Because of this, the granularity has a high correlation with, for example, the lightness of a background, the lightness of the single color of a dark color material, and the amount of the dark color material.

Here, as described previously, the hue value of the background has a high correlation with the amount of all color materials including a dark color material, which are output in a unit area, and therefore, it is possible to measure in advance the hue value of the single color of the dark color material. That is, in the case where the amount of the dark color material and the amount of all the color materials including the dark color material are considered separately, the granularity has a comparatively high correlation with the color material amount. Consequently, it is not necessary to convert the granularity into another physical quantity and it may be possible to create an LUT by using, for example, a figure or the like obtained by dividing the amount of the dark color material by the lightness of the background.

[Example of Image Quality that Changes in Accordance with Color Material Dot Arrangement]

As described above, there are various quantization methods in a print system, and the color material dot arrangement is different for different applied quantization methods and the image quality of an image to be reproduced on a printing medium differs for each applied quantization method. As an example, a difference in image quality between an image having blue noise characteristics with high dot dispersibility and an image having green noise characteristics with low dot dispersibility is explained with reference to FIG. 9A and FIG. 9B.

Figure 9A:
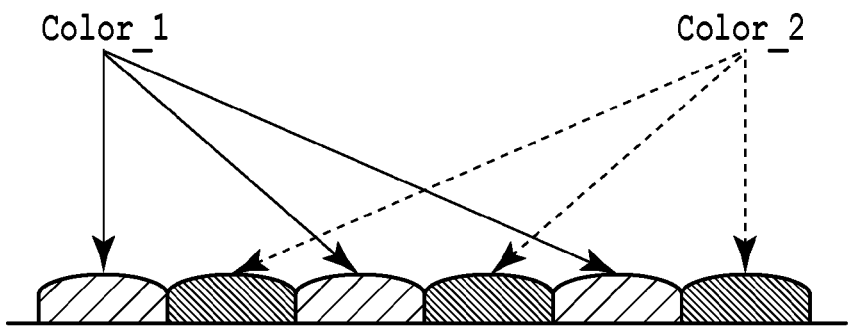
FIG. 9A is a section view of an image having blue noise characteristics with high dot dispersibility in the present embodiment.
Figure 9B:
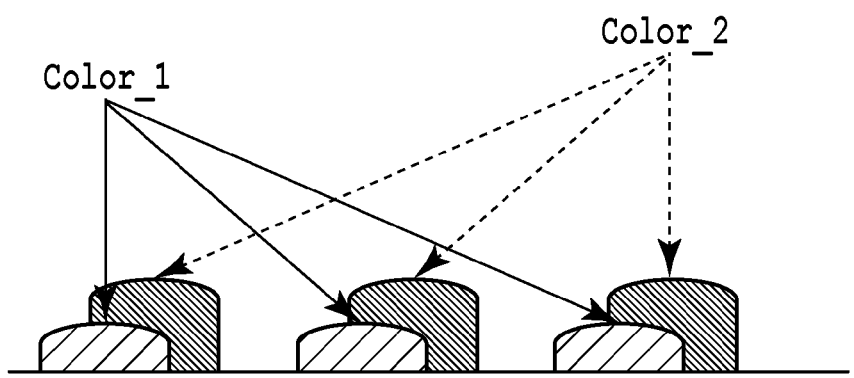
FIG. 9B is a section view of an image having green noise characteristics with suppressed dot dispersibility in the present embodiment.

FIG. 9A is a section view of an image having blue noise characteristics with high dot dispersibility and shows a dot arrangement example in which two kinds of ink are ejected onto a printing medium. On the other hand, FIG. 9B is a section view of an image having green noise characteristics with suppressed dot dispersibility and shows a dot arrangement example in which two kinds of ink are ejected onto a printing medium. As shown in FIG. 9A and FIG. 9B, in FIG. 9A, each dot is arranged side by side but in FIG. 9B, on a dot of Color_1 that is ejected earlier, a dot of Color_2 that is ejected later overlaps. It is assumed that each dot is printed on a printing medium with a high whiteness.

The image quality in the image in FIG. 9A and that in FIG. 9B are compared. First, as to the intensity of gloss, by focusing attention on the outermost surface of the printing medium on which ink dots are arranged, it is known that the intensity of gloss is high on the outermost surface of the printing medium in FIG. 9A, on which the printing medium with a low refractive index has a small area and which is covered with the color materials with a high refractive index. On the other hand, on the outermost surface of the printing medium in FIG. 9B, on which the printing medium with a low refractive index and the area covered with the color materials with a high refractive index exist mixedly, the intensity of gloss is low. That is, even in the case where the color materials of Color_1 and Color_2, the amount of ejected color materials, and the printing media are the same, the intensity of gloss is different for different dot arrangements.

Next, the granularity in the image quality is compared with the other. The granularity is prone to be perceived in the case where the lightness changes locally in a certain area. The granularity in FIG. 9A and that in FIG. 9B are considered, respectively. For example, in the case where L*a*b* are measured, which are color information on 0-degree emission light corresponding to 45-degree incident light, the portion where L* is the highest (brightest) is the printing medium portion and the portion where L* is the lowest (darkest) is the portion where Color_1 and Color_2 overlap. That is, the granularity (RMS granularity or the like) in the dot arrangement (FIG. 9B) in which both the portion where both the printing medium is exposed and the portion where Color_1 and Color_2 overlap exist is high compared to that in the dot arrangement (FIG. 9A) in which inks are arranged side by side. However, this premises that the component value of the color material and the amount of the color material ejected onto the printing medium are the same as those ejected onto the other printing medium. Here, explanation is given as to the image having blue noise characteristics with high dot dispersibility and the image having green noise characteristics with low dot dispersibility, but the embodiment is not limited to this explanation. For example, it may also be possible to use a quantization method of reproducing an image having white noise characteristics and any quantization method having characteristics that change the dot arrangement density, i.e., the ratio of overlap of dots ejected onto a printing medium may be applied as another embodiment.

[Image Processing Apparatus Configuration and Processing Step]

[Image Processing Apparatus Configuration]

Figure 10:
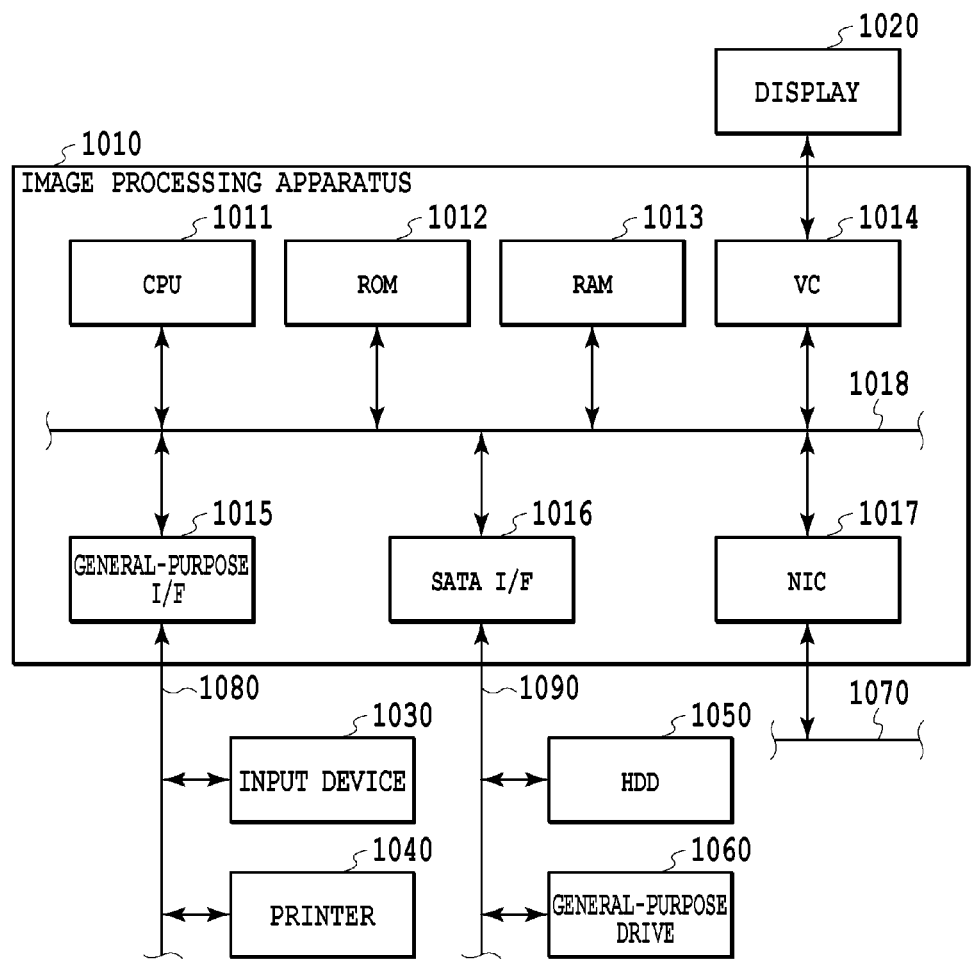
FIG. 10 is a diagram showing a configuration of an image processing apparatus in the present embodiment.

FIG. 10 shows a configuration example of an image processing apparatus 1010 of the present embodiment.

A CPU 1011 controls each configuration via a system bus 1018 by executing an operating system (OS) and various programs stored in a ROM 1012, an HDD 1050, and various storage media using a RAM 1013 as a work memory. The programs executed by the CPU 1011 include programs for image processing or the like, to be described later.

A general-purpose interface (I/F) 1015 is a serial bus interface, for example, USB, and via a serial bus 1080, an input device 1030, such as a mouse and a keyboard, a printer 1040, etc., are connected. The printer 1040 may be an ink jet printer or an electrophotographic printer, and the printing scheme is not limited in particular.

To a serial ATA (SATA) I/F 1016, a general-purpose drive 1060 that performs write and read of the HDD 1050 and various storage media is connected via a serial bus 1090. The CPU 1011 makes use of the HDD 1050 and the various storage media mounted on the general-purpose drive 1060 as a storage of data.

A network interface card (NIC) 1017 is a network interface and connects to a network 1070, for example, a LAN or the like. A video card (VC) 1014 is a video interface and to which a display 1020 is connected. The CPU 1011 displays a user interface (UI) provided by a program on the display 1020 and receives a user input including user instructions via the input device 1030.

[Processing to Generate LUT for Outputting Texture Image]

Figure 11:
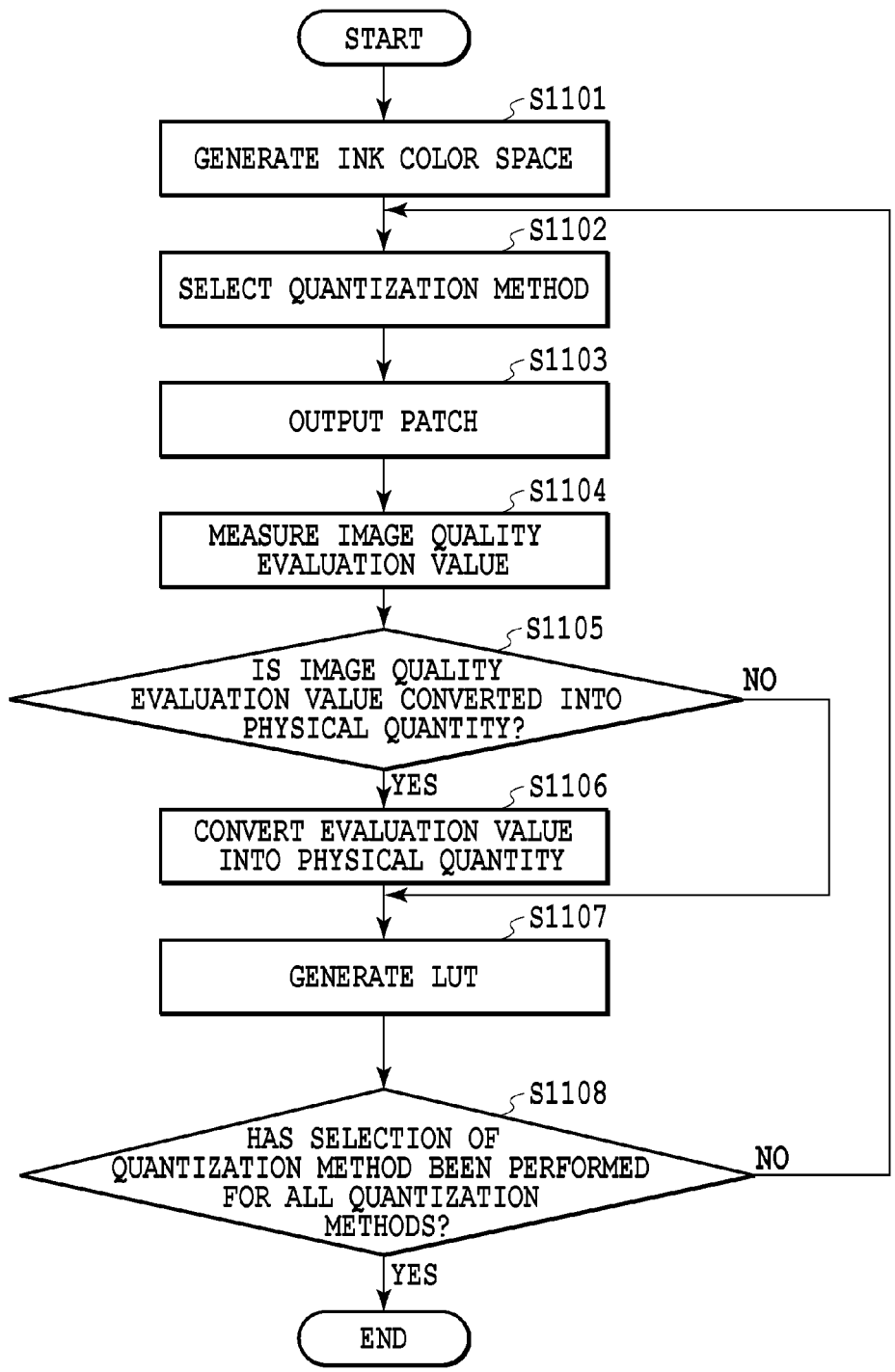
FIG. 11 is a flowchart of LUT generation processing in a first embodiment.

FIG. 11 is a flowchart for explaining steps to generate an LUT for outputting a texture image in the present embodiment. Each step is performed by the CPU 1011 using the ROM 1012 and the RAM 1013.

First, at S1101, a color material color space for generating an LUT is generated, which is represented by combinations of color material colors. In order to generate a color material space, the ECI 2002 chart provided by ECI (European Color Initiative) or the like may be used, which is commonly used as a combination of CMYK for creating an ICC profile relating to hues. Here, in the case where each color material signal value of CMYK is taken to be an 8-bit value, 256 signal values are divided into eight groups and quantized into, for example, eight tone levels. In this case, 8×8×8×8=4,096 combinations are obtained. Further, in the case where a colorless (clear) ink or toner is used in addition to the colors for the subtractive mixture color printing, it is sufficient to generate a color material color space including the color material signals of these color materials. The generated ink color space by combinations is written to the RAM 1013 by the CPU 1011. In the case where the capacity is large, the HDD 1050 or the like is also made use of.

Next, at S1102, a quantization method that is used to perform quantization processing is selected. In the present embodiment, one of a plurality of quantization methods that output dot arrangements of different frequency characteristics is selected.

Next, at S1103, the combination of color materials generated at S1101 is quantized into a digital image by using the quantization method selected at S1102 and the digital image is output by using the printer 1040.

Next, at S1104, the image quality item (hereinafter, sometimes described as "image quality evaluation value") of the patch output at S1103 is measured. For example, in the case of a hue, the measurement that is performed here is performed by using a spectral colorimeter and conversion into CIE L*a*b* or CIE XYZ is also possible. In the present embodiment, explanation is continued by assuming that the signal value (hereinafter, sometimes described as "hue value") indicating the hue acquired here is L*a*b*. Further, as to the texture, the following measurement is performed. For the specular gloss unit (hereinafter, sometimes described as "intensity of gloss"), measurement is performed by using a gloss meter, and for the gloss image clarity (hereinafter, sometimes described as "image clarity"), measurement is performed by using an image clarity meter or a haze meter. Further, for the gloss coloring, it is recommended to use a measuring instrument, such as a goniophotometer and for the granularity, it is recommended to use, for example, the RMS granularity or other well-known methods. The image quality evaluation value relating to the measured texture is associated with the combination of color materials by the CPU 1011 and written to the RAM 1013. In the case where the capacity is large, the HDD 1050 or the like is also made use of. In order to simplify the following explanation, explanation is continued by assuming that the image qualities relating to the texture are the intensity of gloss, the gloss image clarity, and the granularity. For the specular gloss unit, it may be possible to predict the specular gloss unit as described above, in addition to performing measurement.

In the case where the processing proceeds to S1105, whether or not the image quality evaluation value measured at S1104 is converted into another physical quantity is determined. In the present embodiment, the image quality evaluation value refers to the intensity of gloss, the gloss image clarity, and the granularity and the physical quantity refers to the surface refractive index and the surface roughness described above. Whether or not the image quality evaluation value is converted into a physical quantity is determined by the correlation between the image quality evaluation value to be measured as described above and the color material amount. Specifically, a correlation between both is calculated and the degree of the correlation is determined by determining whether or not the correlation is higher than or equal to a threshold value. In the present embodiment, the granularity has a high correlation, and therefore, it is determined that conversion is not performed and the intensity of gloss and the image clarity have a low correlation, and therefore, it is determined that conversion is performed. In the case where it is determined that the evaluation value is converted into a physical quantity, the processing proceeds to S1106 and in the case where it is determined that conversion is not performed, the processing proceeds to S1107.

At S1106, the image quality evaluation value determined to be converted into a physical quantity at S1105 is converted into a physical quantity signal. In the present embodiment, the intensity of gloss and the gloss image clarity are converted into a refractive index and surface roughness. As to this conversion, as described previously, the combination of the intensity of gloss and the image clarity are interconvertible with the combination of the refractive index and the surface roughness.

Figure 12:
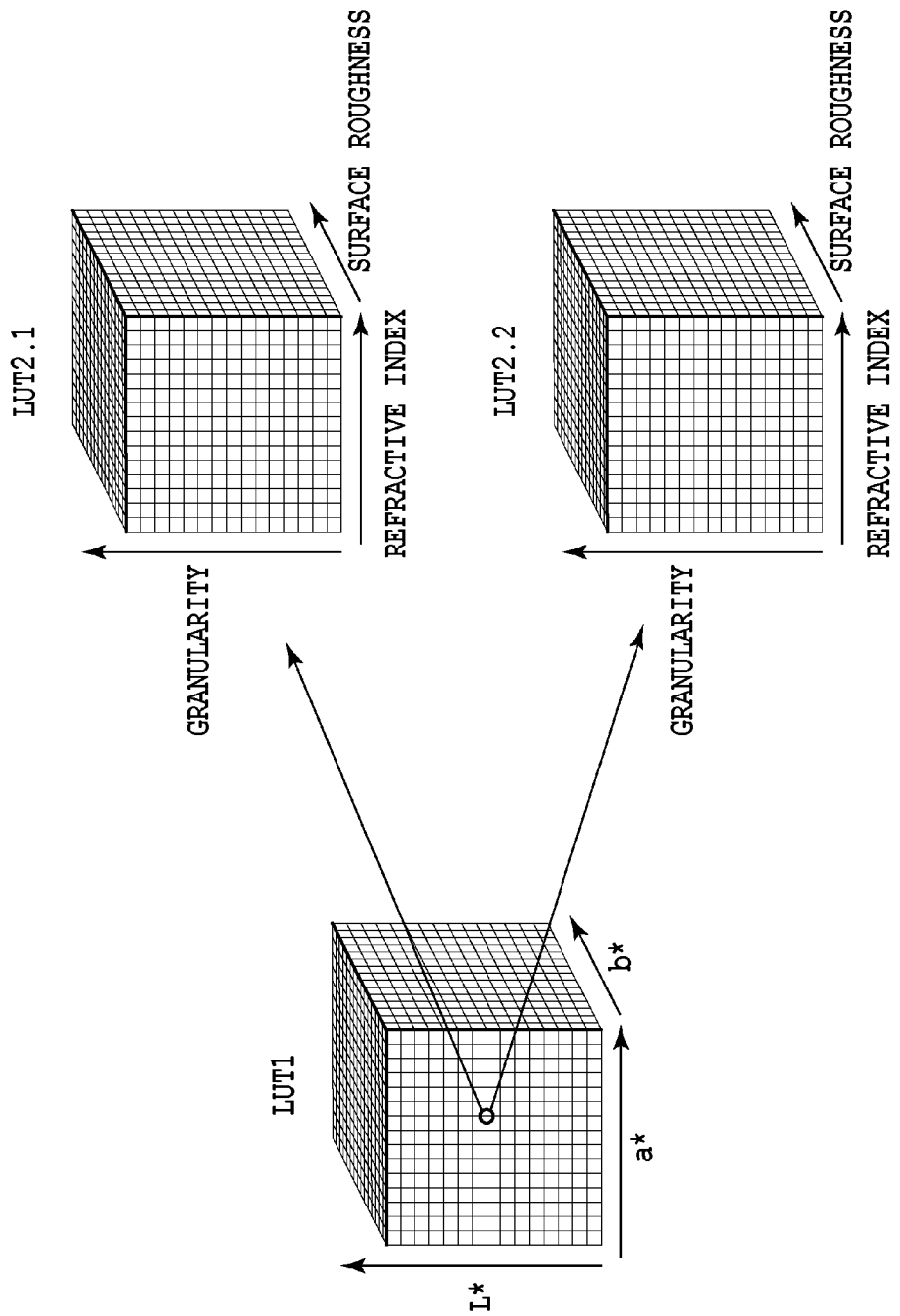
FIG. 12 is a diagram showing an example of an LUT configuration in the first embodiment.

At S1107, an LUT is generated by using the data that has been hither to measured, converted, and associated with the combination of color material amounts. FIG. 12 is a diagram explaining a configuration of an LUT in the present embodiment. An LUT 1 in FIG. 12 is a three-dimensional LUT having the hue values L*a*b* or RGB as axes similar to the ICC profile and the LUT unique to a device, and as an example, an LUT having L*a*b* as axes is shown.

Here, in the well-known LUT, the color material amount is associated with a grid point having L*a*b* as axes, but in the LUT of the present embodiment, LUTs in the second hierarchy in accordance with the quantization method are associated with each grid point. For example, an LUT 2.1 (FIG. 12) is an LUT corresponding to the color material dot arrangement having frequency characteristics with a low degree of dispersion and an LUT 2.2 is an LUT corresponding to the color material dot arrangement having frequency characteristics with a high degree of dispersion, and two or more LUTs in the second hierarchy are associated. In the LUT in the second hierarchy, the grid is formed by using the converted physical quantity values as axes and each grid point is associated with the color material amount. In the present embodiment, the axes of the LUT in the second hierarchy have three dimensions, i.e., the refractive index, the surface roughness, and the granularity, but in the case where an image quality item relating to another texture is added, it is sufficient to increase the number of dimensions to four, five, and so on.

By configuring an LUT so as to have LUTs in multiple stages such as the above, it is possible to define a plurality of combinations of color material amounts representing the same hue value by the LUT 1 and it is made possible to control the texture by the LUT in the second hierarchy. It may also be possible to include a combination of color material amounts in an arbitrary range, for example, such as a color difference of 1, for each grid point of the LUT 1 in the LUT in the second hierarchy in order to extend the range of the image quality control.

The generated LUT is written to the RAM 1013 by the CPU 1011. In the case where the capacity is large, the HDD 1050 or the like is also made use of. Further, the generated LUT is output to the general-purpose drive 1060 and the network 1070 via the NIC 1017 and is made use of in texture image output processing, to be described later, in another system.

Next, at S1108, in the case where both the quantization method with a low degree of dot dispersion and the quantization method with a high degree of dot dispersion are used, whether selection of the quantization method has been made for both the quantization methods is determined. In the case where selection of the quantization method has not been made for both the quantization methods, the processing returns to S1102. In the case where selection of the quantization method has been made for both the quantization methods, the series of processing by this flowchart is terminated. In the present embodiment, the case where there are two quantization methods is explained, but the present embodiment is not limited to this case. For example, there may be three or more quantization methods, and in such a case, a type of quantization method in which the ratio of overlap of the color material dot ejected earlier and the color material dot ejected later and the frequency characteristics indicating the degree of color material dot dispersion are different is used. As an example, it is possible to use a type of quantization method corresponding to each of the noise characteristics, such as blue noise, green noise, and white noise characteristics.

[Texture Image Output Processing]

Figure 13:
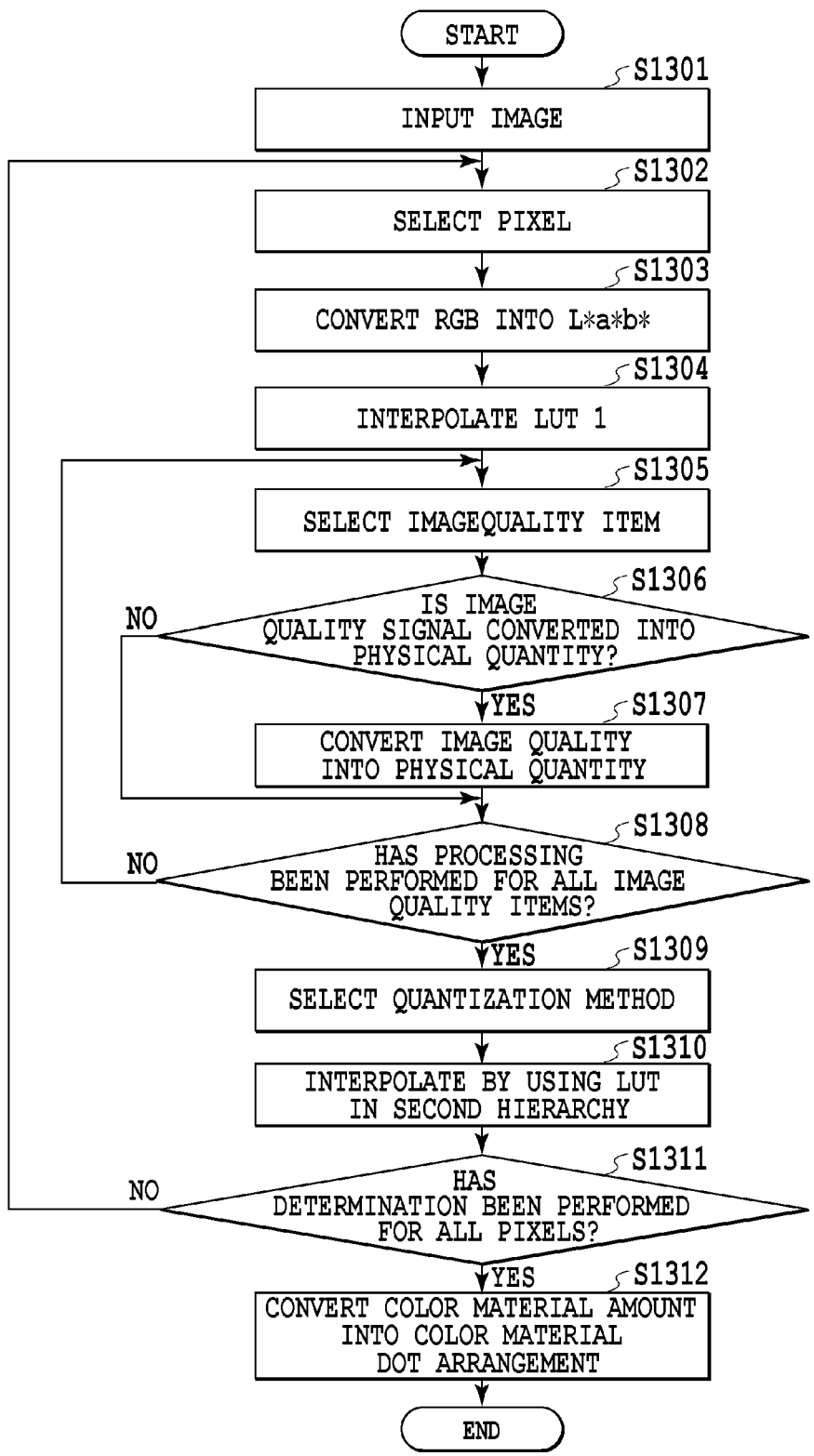
FIG. 13 is a flowchart of image data conversion processing in the first embodiment.

FIG. 13 is a flowchart for explaining steps of image data conversion processing according to texture image output processing in the present embodiment.

First, at S1301, image data to be output (image signal) is input. The input image data in the present embodiment includes information indicating an image quality, in addition to hue data (hue signal) such as normal RGB. The information indicating an image quality may be determined for each pixel or may be determined for each image area.

Figure 14:
FIG. 14 is a diagram showing an example of an input image in the present embodiment.

Examples of images to be input are shown in FIG. 14. FIG. 14 shows examples of input image information about each of four image sets. Each image shows information on RGB as hue information and image information, such as the intensity of gloss, the gloss image clarity, and the granularity, as image quality information representing texture. Each image representing image quality information may hold hue information and image quality information at the same time, or may be two images corresponding to hue information and image quality information, respectively. In FIG. 14, RGB are used as hue information, but CMYK or Lab may also be used.

The hue information about four image sets shown in FIG. 14 is made common for explanation and only the image quality information is different. Image No. 1 is an example in which the intensity of gloss and the gloss image clarity are set high across the entire area of the image. Image No. 2 is an example in which the intensity of gloss and the gloss image clarity of the background portion are set low. Image No. 3 is an example in which the intensity of gloss of the background portion is set to an intermediate level and the granularity is set low. Image No. 4 is an example in which the granularity is set high. By setting the texture as image data as described above, the image quality information is obtained for each pixel or for each area of the image like the hue information.

The image quality information is not limited to the intensity of gloss, the gloss image clarity, or the granularity, and for example, it may also be possible to specify the gloss coloring or the like. At this time, it may also be possible to input information corresponding to a*b* as control information on the gloss coloring or to input information on RGB.

The image information is read from the HDD 1050 by the CPU 1011. It may also be possible to read the image information from the general-purpose drive 1060 and the network 1070 via the NIC 1017. The input image information is written to the RAM 1013 by the CPU 1011 for later processing. In the case where the capacity is large, the HDD 1050 or the like is also made use of.

At S1302, one pixel is selected from the image input at S1301 for later conversion processing. The hue information and the image quality information on the selected pixel are written to the RAM 1013 by the CPU 1011 for later processing.

In the case where the processing proceeds to S1303, first, RGB, which are hue information, are converted into L*a*b*, which are device-independent hue values. The device-independent hue values are not limited to L*a*b*, and a space, such as XYZ and CIECAM, is also made use of. The conversion from RGB into the device-independent hue values is conversion to the axes of the LUT 1 as shown in FIG. 12 and for example, the axes of the LUT 1 may be RGB, and in this case, conversion is not performed. Further, also in the case where the axes of the LUT 1 are the device-independent hue values and the input hue information is the device-independent hue values from the beginning, conversion is not performed. The converted hue values are written to the RAM 1013 by the CPU 1011.

Next, at S1304, interpolation of the LUT 1 is performed. In interpolation, interpolation calculation of the LUT 1 is performed by using the well-known tetrahedral interpolation, the cubic interpolation, etc. In a normal LUT, each grid point of the LUT is associated with the color material amount value or the like, but in the present embodiment, in order to control the texture corresponding to a dot arrangement pattern, an LUT in the second hierarchy, such as the LUT 2.1 and the LUT 2.2, is associated. The generated LUT 1 is written to the RAM 1013 by the CPU 1011 for later processing. In the case where the capacity is large, the HDD 1050 or the like is also made use of.

In the case where the processing proceeds to S1305, at least one is selected from the image quality information input at S1301, for example, the intensity of gloss, the gloss image clarity, the granularity, etc. In the case where the input image quality information is image No. 1 shown in FIG. 14, first, the intensity of gloss and the gloss image clarity are selected. In the case where there is another piece of image quality information, the processing returns from S1308 and the next image quality information is selected. The selected information on the intensity of gloss and the gloss image clarity is written to the RAM 1013 by the CPU 1011.

At S1306, whether or not to convert the image quality signal selected at S1305 into another physical quantity is determined. In the case where the intensity of gloss and the gloss image clarity are selected, these image quality signals are converted into the refractive index and the surface roughness as described previously. In this case, as shown in the example in FIG. 4, the correlation between the color material amount and the surface refractive index after the conversion becomes high. Because of this, as explained in FIG. 3, it is determined that the intensity of gloss and the image clarity are converted into the surface refractive index whose correlation with the color material amount becomes high, and the surface roughness, and then, the processing proceeds to S1307.

On the other hand, as to the image quality evaluation value whose correlation with the color material amount is high and the correlation does not become high even in the case where the image quality evaluation value is converted into another piece of physical information, such as the granularity, it is determined that conversion is not performed, and then, the processing proceeds to S1308. Even in the case of the image quality for which it is determined that conversion is not performed, on a condition that the input image quality signal is, for example, the 8-bit image signal as shown in FIG. 14, it is necessary to convert the image quality into a relative image quality signal. In the case where the image quality that is not converted is, for example, the granularity, normalization in which the minimum value and the maximum value of the granularity of the LUT 2 to be interpolated at S1310 as in FIG. 14 are clipped to 8-bit 0 and 8-bit 255 is performed, and thus, the granularity is converted into one that can be reproduced by the printer 1040.

Figure 15:
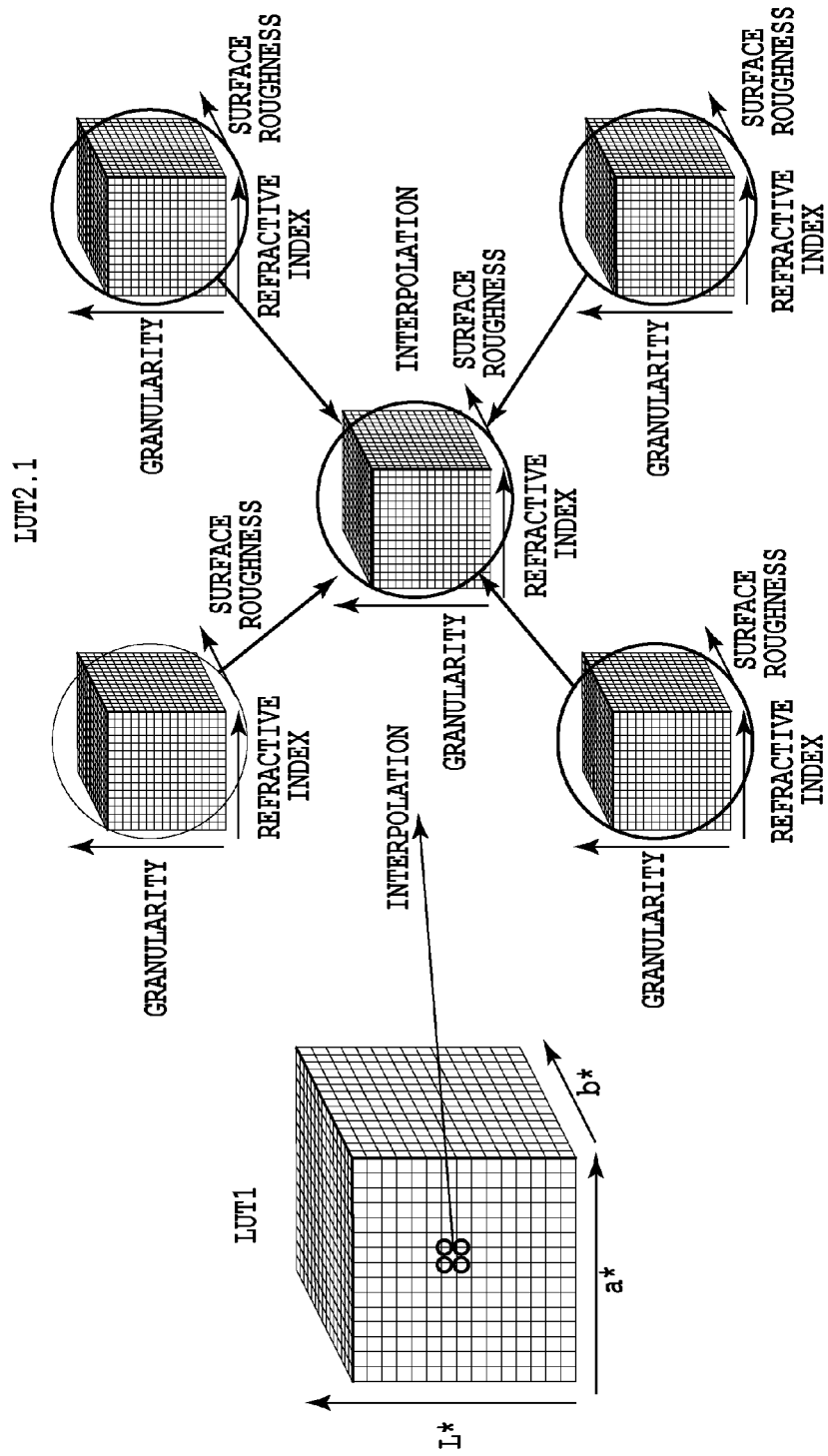
FIG. 15 is a diagram showing an example of interpolation of a data conversion LUT in the first embodiment.

In the case where the processing proceeds to S1307, the image quality signal for which it is determined that conversion is performed at S1306 is converted into a physical quantity signal. For example, the intensity of gloss and the gloss image clarity are converted into the refractive index and the surface roughness, and the gloss coloring is converted into a layer thickness of a thin layer as described previously. The results of the conversion are written to the RAM 1013 by the CPU 1011. In the case where the capacity is large, the HDD 1050 or the like is also made use of. In the case where the image quality signal that is converted at this step is, for example, the 8-bit image signal as shown in FIG. 14, it is necessary to convert the image quality signal into a relative physical quantity signal as in the normalization explained at S1306. For example, in the case where the image quality signal that is converted is the intensity of gloss and the gloss image clarity, normalization is performed by clipping the minimum values and the maximum values of the refractive index and the surface roughness of the LUT 2 to be interpolated at S1310 as in FIG. 15 to 8-bit 0 and 8-bit 255. By this normalization, the image quality signal is converted into a physical quantity signal that can be reproduced.

Next, at S1308, whether or not the processing at S1306 and S1307 has been performed for all the image quality items included in the image input at S1301 is determined. In the case where it is determined that the processing of all the image qualities has not been performed yet, the processing returns to S1305 and on the other hand, in the case where it is determined that all the processing has been performed, the processing proceeds to S1309.

Figure 16:
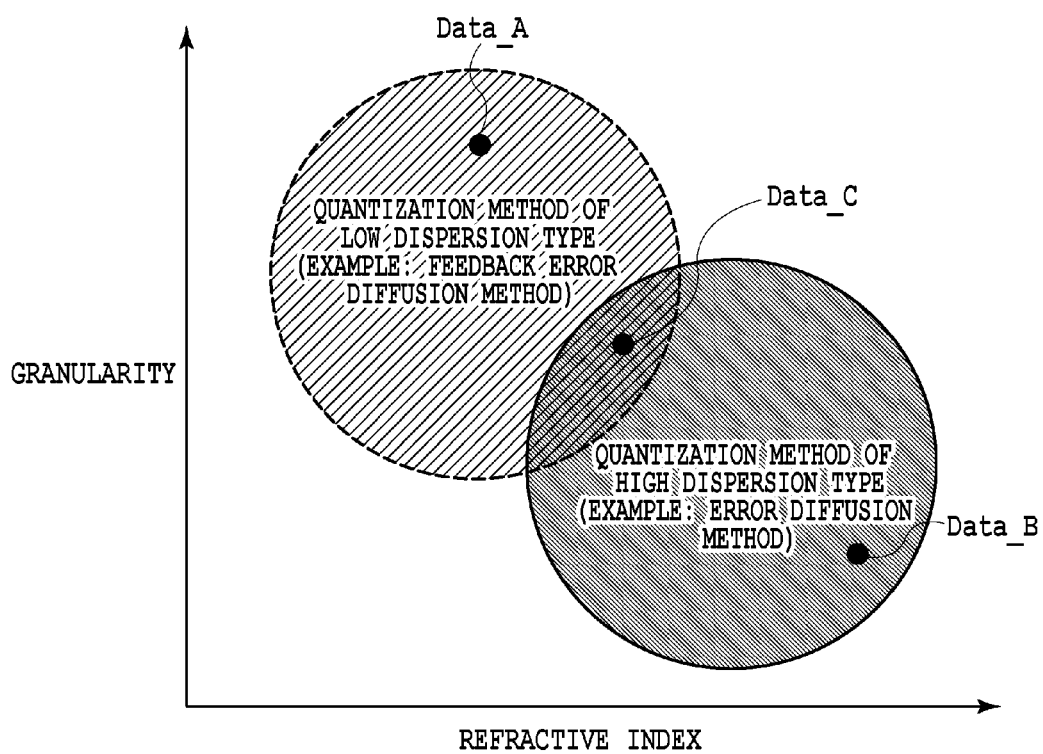
FIG. 16 is a diagram showing an example of selection of a quantization method in the present embodiment.

At S1309, based on the physical quantities acquired by the processing at S1305 to S1308, a quantization method corresponding to the physical quantities is selected. Selection of a quantization method in the present embodiment is explained by using FIG. 16. In the graph shown in FIG. 16, the horizontal axis represents the refractive index and the vertical axis represents the granularity as examples of physical quantity values that are used as the axes of the LUT in the second hierarchy (FIG. 12). The area surrounded by the broken line represents a physical quantity space in which the combination of color material amounts representing the same hue may change in the quantization method with a low dispersion type as shown in FIG. 9B. Similarly, the area surrounded by the solid line represents a physical quantity space in which the combination of color material amounts representing the same hue may change in the quantization method of a high dispersion type as shown in FIG. 9A. As shown in FIG. 16, by changing the quantization method of the color material and the combination of color material amounts representing the same hue, the area that can be reproduced by the physical quantity space of the refractive index and the granularity is extended.

Here, the selection of a quantization method at this step is explained by taking the case where the refractive index and the granularity among the physical quantities obtained by the processing at S1305 to S1308 are, for example, Data_A, Data_B, and Data_C in FIG. 16 as an example. In the case where the refractive index and the granularity are Data_A as shown in FIG. 16, a quantization method of a low dispersion type, for example, the feedback error diffusion method or the like, is selected in order to output an image representing the texture. Similarly, in the case where the refractive index and the granularity are the values of Data_B, a quantization method with a high dispersion type, for example, the error diffusion method or the like, is selected in order to output an image representing the texture. On the other hand, in the case where the refractive index and the granularity are the values of Data_C, any quantization method may be selected in order to output an image representing the texture. It may also be possible to design the present embodiment so that the same quantization method as that for the immediately previous pixel is selected in order to suppress switching of the quantization method in the case where the values of Data_C are input as the refractive index and the granularity. Alternatively, it may also be possible to design the present embodiment so that a quantization method that is selected more times in a pixel area that is set arbitrarily, such as eight pixels around the pixel of interest selected at S1302 is selected. Processing to determine a color material dot arrangement at S1312, to be described later, by using the quantization method selected at S1309 configures a dot arrangement determination unit.

It is possible to apply, for example, the method described in Japanese Patent Laid-Open No. 2008-219291 as the quantization method switching control. That is, by varying the feedback coefficient as a parameter, it is possible to switch the quantization method between the error diffusion method and the feedback error diffusion method and to make different the frequency characteristics of an output image. Further, as another method, it is also possible to switch the quantization methods by preparing a plurality of dither matrices with different dot dispersibilities and by changing the dither matrix before the quantization processing.

In the case where the processing proceeds to S1310, by using the LUT 2.1 or the LUT 2.2 corresponding to the quantization method, the color material amount is found by performing interpolation processing based on the image quality signal converted into a physical quantity (S1307) or the image quality signal not converted into a physical quantity (S1306: NO). The color material amount at S1310 is calculated by interpolating the LUT in the second hierarchy by using the well-known interpolation technique, such as the cubic interpolation and the tetrahedral interpolation, as at S1304. The results of the interpolation are written to the RAM 1013 by the CPU 1011 as the color material amount that reproduces the texture of the input image selected at S1301. In the case where the capacity is large, the HDD 1050 or the like is also made use of. The processing to calculate a color material amount by interpolating the LUT at S1310 as described above configures a color material amount determination unit.

At S1311, whether or not the color material amount has been determined for all the pixels of the image input at S1301 is determined. In the case where it is determined that the color material amount has not been determined yet for all the pixels, the processing is returned to S1302. On the other hand, in the case where it is determined that the color material amount has been determined for all the pixels, the processing proceeds to processing at S1312.

In the case where the color material amount has been determined for all the pixels (S1311: YES), the processing proceeds to S1312 and a color material dot arrangement for reproducing the texture of the input image is determined. In the present embodiment, by using one of the quantization method of a low dispersion type and the quantization method with a high dispersion type selected at S1309, the color material dot arrangement is found from the color material amount acquired at S1310.

In more detail, each piece of the color separation information C, M, Y, K, c, m, and gy representing a color material amount is converted into quantization information at a lower tone level. Here, C corresponds to cyan, M to magenta, Y to yellow, K to black, c to pale cyan, m to pale magenta, and gy to pale black, respectively. In the case where each of C, M, Y, K, c, m, and gy is specified by 8-bit color conversion data, quantization processing to convert the color separation data of each of C, M, Y, K, c, m, and gy into, for example, 4-bit quantization data is performed. This 4-bit data is used as index data for indicating the color material dot arrangement in the case where the printer 1040 ejects color material dots onto a printing medium. The conversion from color separation data into quantization data is not limited to the quantization processing into 4-bit data and halftone processing into binary data may be performed. In the case where the color material dot arrangement has been determined for all the pixels of the image input at S1301, the series of processing by this flowchart is terminated.

In the area of an input image in which the change in hue is smooth, switching the quantization methods may result in the case where deterioration in image quality occurs, and therefore, it is desirable for the switching of the quantization method to be suppressed. As a method of suppressing the switching of the quantization method, it is sufficient to perform, for example, processing, such as a low-pass filter, a wavelet analysis, and an edge extraction filter, for the input image and to prevent the switching of the quantization method within a plurality of image areas obtained as the results of the processing.

Figure 17:
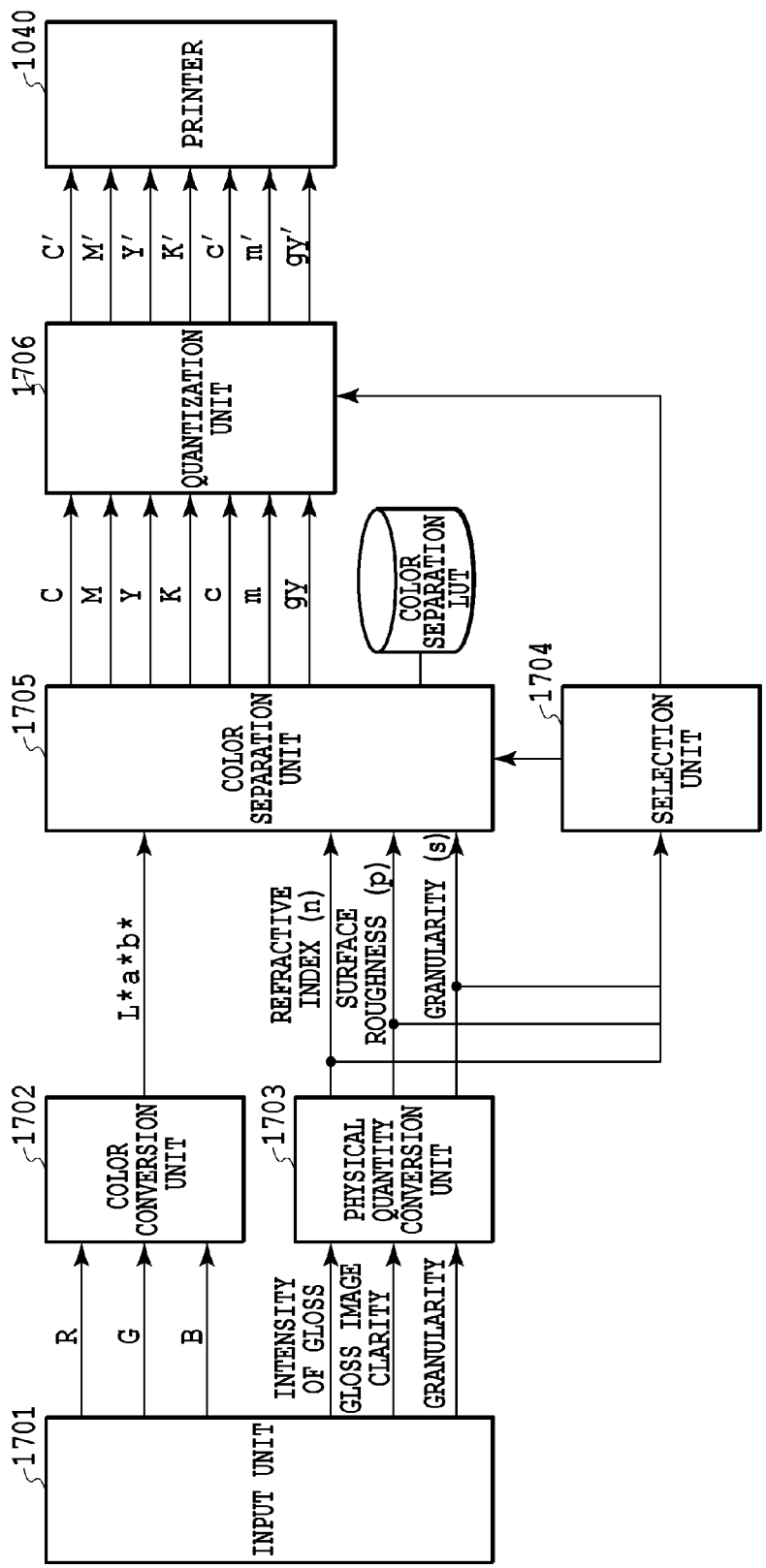
FIG. 17 is a function block diagram of a print system in the present embodiment.

FIG. 17 is a function block diagram of a print system in the present embodiment. Hereinafter, the texture image output processing of the present embodiment is explained with reference to the function block diagram in FIG. 17.

An input unit 1701 receives an input of image signals (image data) to be output. As the image signals that are input, an image quality signal (image quality data) representing the texture of an image is input as well as a hue signal (hue data) representing the hue of the image. In the present embodiment, the input unit 1701 receives the intensity of gloss, the gloss image clarity, and the granularity as the image quality signals.

A color conversion unit 1702 converts input image signals RGB into L*a*b*, which are device-independent color information. On the other hand, a physical quantity conversion unit 1703 converts the image quality signal that can be converted among the input image quality signals into a physical quantity signal indicating a physical quantity. In the present embodiment, the intensity of gloss and the gloss image clarity, which are the image quality signals, are converted into the refractive index (n) and the surface roughness (p), which are physical quantity signals. As to the granularity, the value of the image quality signal is output as it is as a physical quantity signal.

Upon receipt of the physical quantity signals (refractive index n, surface roughness p, granularity s) from the physical quantity conversion unit 1703, a selection unit 1704 selects a quantization method corresponding to the physical quantities. In the present embodiment, one of the quantization method of a high dispersion type and the quantization method with a low dispersion type is selected. As described previously, the quantization method with a high dispersion type outputs a color material dot arrangement with a high degree of dispersion and the quantization method with a low dispersion type outputs a color material dot arrangement of a low degree of dispersion. As a result of this, it is possible for the printer 1040 to output images with different frequency characteristics.

A color separation unit 1705 generates color separation signals (C, M, Y, K, c, m, gy) indicating the color material amounts based on the L*a*b* signals, which are hue values, and the physical quantity signals (refractive index n, surface roughness p, granularity s) by referring to the color separation table.

A quantization unit 1706 converts the color separation signals C, M, Y, K, c, m, gy into quantization signals C', M', Y', K', c', m', gy' indicating a color material dot arrangement by using the quantization method selected by the selection unit 1704.

The printer 1040 arranges dots for each corresponding pixel on a printing medium in accordance with the quantization signals received from the quantization unit 1706. Alternatively, the printer 1040 arranges dots for each corresponding pixel on a printing medium by reading a dot arrangement pattern corresponding to the quantization signals received from the quantization unit 1706.

As explained above, according to the image processing apparatus in the present embodiment, the input image quality signals are converted into physical quantity signals and color separation processing and quantization processing in accordance with the physical quantities are performed. Because of this, it is possible to obtain output values, such as a color material amount and a color material dot arrangement, that take into consideration not only the hue but also the texture of the input image.

Second Embodiment

As the conversion from the hue information and the image quality information into the color material amount or the conversion from the hue information and the image quality information converted into physical quantity signals into the color material amount in the first embodiment, the example is shown in which the conversion is determined by the processing using the LUTs in the two hierarchies, including the LUT in the first hierarchy and the LUT in the second hierarchy. However, in another embodiment, it may also be possible to hold the LUT as a multi-dimensional LUT in place of a hierarchy type LUT.

FIG. 18 shows an example of a multi-dimensional LUT. In a multi-dimensional LUT, as input dimensions, L*a*b*, each of which is a hue value, the refractive index, the surface roughness, and the granularity are set. As output dimensions, for example, the color material amounts, such as C, M, Y, K, c, m, and gy, are set.

Figure 19:
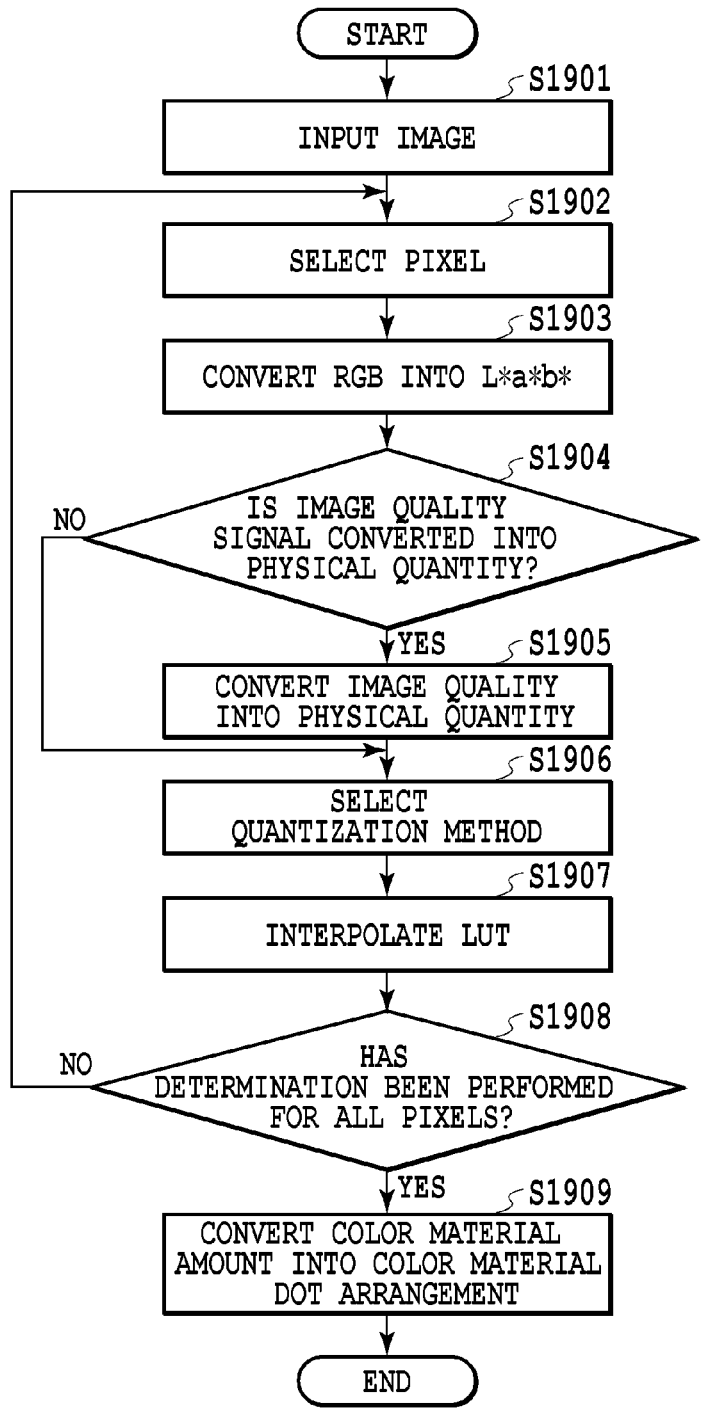
FIG. 19 is a flowchart of image data conversion processing in the second embodiment.

By configuring a multi-dimensional LUT as shown in FIG. 18, it is possible to associate the color material amount with the image quality information, or the color material amount with the image quality information converted into the physical quantity signal in the same LUT. That is, in the present embodiment, the processing at S1304 in FIG. 13 is performed at S1907 in FIG. 19.

The processing at S1907 in the present embodiment is explained by taking the case where the image quality information that is referred to is the granularity as an example. L*a*b* calculated at S1903 are sorted so that a color difference becomes less than or equal to an arbitrary value by using the color difference formula of CIE. Based on the results of the sort, relevant combinations of color material amounts are derived. Then, from among the derived combinations of color material amounts, the color material amount corresponding to the image quality information (granularity) input at S1901 is further derived. At this time, by considering that the minimum value and the maximum value of the granularity are 8-bit 0 and 8-bit 255, the granularity is converted into granularity with which the pixel can be reproduced. The interpolation processing for the converted granularity and the subsequent processing are the same as those of the first embodiment.

That is, by holding in advance the image quality information, such as the refractive index, the surface roughness, and the granularity, in a multi-dimensional LUT so as to be capable of being referred to, it is possible to perform interpolation processing for the image quality signal following the interpolation processing for the hue value. Further, by having a plurality of values for the refractive index, the surface roughness, the granularity, etc., in accordance with quantization methods, even in the case where the quantization method changes, it is possible to perform interpolation processing as described above. From the above, it is possible to implement the present embodiment by one multi-dimensional LUT according to the second embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in an image processing apparatus that performs color separation processing and quantization processing, it is possible to obtain an output value that takes into consideration not only hue but also texture.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-200484, filed Oct. 8, 2015, which is hereby incorporated by reference wherein in its entirety.

What is claimed is:

1. An image processing apparatus comprising:
   at least one processor;
   a memory coupled with the at least one processor and having stored thereon instructions that, when executed by the at least one processor, cause the image processing apparatus to:
      input a hue signal representing a hue of an image and an image quality signal representing a texture of the image;
      convert the image quality signal into a physical quantity signal indicating at least a refractive index of a color material corresponding to the image quality signal; and
      determine a color material dot arrangement for outputting the image by using either quantization method of reproducing an image having blue noise characteristics exhibiting high dispersibility or quantization method of reproducing an image having green noise characteristics exhibiting low dispersibility based on the hue signal and the physical quantity signal,
   wherein the quantization method of reproducing an image having blue noise characteristics is used in a case where the refractive index is high, and the quantization method of reproducing an image having green noise characteristics is used in a case where the refractive index is low.

2. The image processing apparatus according to claim 1, wherein the image quality signal includes a signal indicating an intensity of gloss and a signal indicating gloss image clarity and physical quantities corresponding to the signals are a refractive index and surface roughness of an image, respectively.

3. The image processing apparatus according to claim 1, wherein the image quality signal includes a signal indicating gloss coloring and a physical quantity corresponding to the signal is a refractive index of a color material and an area ratio of dots on an image surface.

4. The image processing apparatus according to claim 1, wherein the image quality signal includes a signal indicating gloss coloring and a physical quantity corresponding to the signal is a layer thickness of a color material in an image.

5. The image processing apparatus according to claim 1, wherein the color material dot arrangement is an arrangement in which a color material dot that is ejected earlier and a color material dot that is ejected later overlap.

6. The image processing apparatus according to claim 1, wherein the instructions, when executed by the at least one processor, further cause the image processing apparatus to:
   select a quantization method in accordance with a physical quantity indicated by the physical quantity signal, and
   wherein the color material dot arrangement is determined by using the selected quantization method.

7. The image processing apparatus according to claim 6, wherein a quantization method is selected by using a table for associating the refractive index and a degree of granularity with a quantization method.

8. The image processing apparatus according to claim 1, wherein a color material amount is determined by using a lookup table in which values of the hue signal and values of the physical quantity signal are stored and by performing interpolation processing using at least one of the values of the hue signal and the values of the physical quantity signal as an axis.

9. The image processing apparatus according to claim 8, wherein grid points along an axis of at least one of the values of the hue signal and the values of the physical quantity signal are arranged evenly.

10. The image processing apparatus according to claim 1, wherein the physical quantity signal further indicates a degree of granularity of an image, and
   wherein the quantization method of reproducing an image having blue noise characteristics is used in a case where the degree of granularity is low, and the quantization method of reproducing an image having green noise characteristics is used in a case where the degree of granularity is high.

11. An image processing method comprising the steps of:
   inputting a hue signal representing a hue of an image and an image quality signal representing a texture of the image;
   converting the image quality signal into a physical quantity signal indicating at least a refractive index of a color material corresponding to the image quality signal; and
   determining a color material dot arrangement for outputting the image by using either quantization method of reproducing an image having blue noise characteristics exhibiting high dispersibility or quantization method of reproducing an image having green noise characteristics exhibiting low dispersibility based on the hue signal and the physical quantity signal,
   wherein the quantization method of reproducing an image having blue noise characteristics is used in a case where the refractive index is high, and the quantization method of reproducing an image having green noise characteristics is used in a case where the refractive index is low.

12. A non-transitory computer readable storage medium storing a program for causing a computer to function as an image processing apparatus, which comprises at least one processor and a memory having stored thereon instructions that, when executed by the at least one processor, cause the image processing apparatus to:
   input a hue signal representing a hue of an image and an image quality signal representing a texture of the image;
   convert the image quality signal into a physical quantity signal indicating at least a refractive index of a color material corresponding to the image quality signal; and
   determine a color material dot arrangement for outputting the image by using either quantization method of reproducing an image having blue noise characteristics exhibiting high dispersibility or quantization method of reproducing an image having green noise characteristics exhibiting low dispersibility based on the hue signal and the physical quantity signal,
   wherein the quantization method of reproducing an image having blue noise characteristics is used in a case where the refractive index is high, and the quantization method of reproducing an image having green noise characteristics is used in a case where the refractive index is low.

* * * * *